(12) United States Patent
Hadzic et al.

(10) Patent No.: US 7,372,875 B2
(45) Date of Patent: May 13, 2008

(54) SYSTEMS AND METHODS FOR SYNCHRONIZATION IN ASYNCHRONOUS TRANSPORT NETWORKS

(75) Inventors: Ilija Hadzic, Randolph, NJ (US); Edward Stanley Szurkowski, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1106 days.

(21) Appl. No.: 10/260,790

(22) Filed: Sep. 30, 2002

(65) Prior Publication Data
US 2004/0062278 A1    Apr. 1, 2004

(51) Int. Cl.
*H04J 3/06* (2006.01)

(52) U.S. Cl. ...................... 370/516; 375/373
(58) Field of Classification Search ............ None
See application file for complete search history.

(56) References Cited

U.S. PATENT DOCUMENTS

| | | | | |
|---|---|---|---|---|
| 5,025,457 A | * | 6/1991 | Ahmed .................... | 375/354 |
| 5,224,132 A | | 6/1993 | Goldberg | |
| 5,579,348 A | * | 11/1996 | Walker et al. ............. | 375/355 |
| 5,822,383 A | * | 10/1998 | Muntz et al. ............. | 375/362 |
| 5,896,427 A | * | 4/1999 | Muntz et al. ............. | 375/372 |
| 6,327,274 B1 | * | 12/2001 | Ravikanth ................. | 370/516 |
| 6,522,205 B2 | * | 2/2003 | Kallio et al. .............. | 331/1 R |
| 6,686,803 B1 | * | 2/2004 | Perrott et al. ............ | 331/10 |

OTHER PUBLICATIONS

A-2100 in A-2000 Family of Optical Ethernet Edge Switches, http://www.atrica.com/products/a_2100.html, accessed Dec. 3, 2003, Publisher: Atrica, Inc., published 2001.
Abate et al., AT&T's New Approach to the Synchronization of Telecommunication Networks, IEEE Communications Magazine, Apr. 1989, pp. 35-45, vol. 27, No. 4.

(Continued)

*Primary Examiner*—Bob A. Phunkulh

(57) ABSTRACT

Techniques for synchronizing the clock of a local telecommunications network connected to a remote clock source through an asynchronous transport network such as an Ethernet metropolitan area transport network. A basic hold-over loop for retaining the current reconstructed clock frequency signal receives weighted corrections from an open loop and a network time protocol filter loop. The open loop measures data packet interarrival times on the local network and calculates a first reconstructed clock frequency signal. The network time protocol loop applies network time protocol to generate timestamps over the asynchronous transport network which are used to generate a second reconstructed clock frequency signal. The first and second reconstructed clock frequency signals are combined using dynamically adjusted weight factors and compared with the current reconstructed clock frequency signal to correct the latter which then synchronizes the clock of the local telecommunications network.

23 Claims, 18 Drawing Sheets

OTHER PUBLICATIONS

Ahmed et al., ATM Circuit Emulation—A Comparison of Recent Techniques, Proceedings of IEEE Globecom, 1991, pp. 370-374.

Babcock, Sonet: A Practical Perspective, Business Communications Review, Sep. 1990, pp. 59-63, vol. 20, No. 9.

Bregni, A Historical Perspective on Telecommunications Network Synchronization, IEEE Communications Magazine, Jun. 1998, pp. 158-166, vol. 36, No. 6.

Breslau et al., Advances in Network Simulation, IEEE Computer Magazine, May 2000, pp. 59-67, vol. 33, No. 5.

Chapman, Enhancing Transport Networks with Internet Protocols, IEEE Communications Magazine, May 1998, pp. 100-104, vol. 36, No. 5.

Egan, The Elementary Phase-Locked Synthesizer, Frequency Synthesis by Phase Lock, 2d ed., 1999, pp. 35-70, Publisher: John Wiley & Sons, Inc.

Egan, Phase Detectors, Frequency Synthesis by Phase Lock, 2d ed., 1999, pp. 175-243, Publisher: John Wiley & Sons, Inc.

Floyd, Link-Sharing and Resource Management Models for Packet Networks, IEEE/ACM Transactions on Networking, Aug. 1995, pp. 365-386, vol. 3, No. 4.

ITU-T Recommendation 1.363.1: B-ISDN ATM Adaptation Layer Specification: Type 1 AAL, Series I: Integrated Services Digital Network, Aug. 1996, Publisher: ITU-T Telecommunication Standardization Sector of ITU.

ITU-T Recommendation G.824: The Control of Jitter and Wander Within Digital Networks which are Based on the 1544 kbit/s Hierarchy, Series G: Transmission Systems and Media, Digital Systems and Networks, Mar. 2000, Publisher: ITU-T Telecommunication Standardization Sector of ITU.

ITU-T Recommendation G.825: The Control of Jitter and Wander Within Digital Networks which are Based on the Synchronous Digital Hierarchy (SDH), Series G: Transmission Systems and Media, Digital Systems and Networks, Mar. 2000, Publisher: ITU-T Telecommunication Standardization Sector of ITU.

Lau, Synchronous Techniques for Timing Recovery in BISDN, IEEE Transactions on Communications, Feb./Mar./Apr. 1995, pp. 1810-1818, vol. 43, No. 2/3/4.

Lindsey, A Survey of Digital Phase-Locked Loops, Proceedings of the IEEE, Apr. 1981, pp. 410-431, vol. 69, No. 4.

Mills, Adaptive Hybrid Clock Discipline Algorithm for the Network Time Protocol, IEEE/ACM Transactions on Networking, Oct. 1998, pp. 505-514, vol. 6, No. 5.

Mills, Improved Algorithms for Synchronizing Computer Network Clocks, IEEE/ACM Transactions on Networking, Jun. 1995, pp. 245-254, vol. 3, No. 3.

Mills, Modeling and Analysis of Computer Network Clocks, Electrical Engineering Report 92-5-2, May 1992, Publisher: University of Delaware.

Mills, On the Accuracy and Stability of Clocks Synchronized by the Network Time Protocol in the Internet System, ACM Computer Communication Review, Jan. 1990, pp. 65-75, vol. 20, No. 1.

Mitra, Network Synchronization: Analysis of a Hybrid of Master-Slave and Mutual Synchronization, IEEE Transactions on Communications, Aug. 1980, pp. 1245-1259, vol. COM-28, No. 8.

Noro et al., Circuit Emulation over IP Networks, Protocols for High-Speed Networks VI, eds. Touch et al., 1999, pp. 187-201, Publisher: Kluwer Academic Publishers.

Oppenheim et al., Fourier Analysis of Signals Using the Discrete Fourier Transform, Discrete-Time Signal Processing, 1989, pp. 695-767, Publisher: Prentice Hall.

Pate et al., Framework for Pseudo Wire Emulation Edge-to-Edge (PWE3), draft-pate-pwe3-framework-02.txt, Sep. 2001, Publisher: The Internet Society.

Phillips et al., Digital Controller Design, Digital Control System Analysis and Design, 2d ed., 1990, pp. 265-313, Publisher: Prentice Hall.

PowerQUICC II Integrated Communications Processor Family, Motorola Fact Sheet, Rev. 7, 2003.

Resilient Packet Transport (RPT) for Metropolitan Area Networks, 2001, Publisher: Luminous Networks, Inc.

Schulzrinne et al., RTP: A Transport Protocol for Real-Time Applications, Request for Comments: 1889, Jan. 1996.

Stein et al., Circuit Extension over IP: The Evolutionary Approach to Transporting Voice and Legacy Data over IP Networks, TDMoIP for carriers, version 2.0, Publisher: RAD Data Communications, Inc.

Synchronization Interface Standard, ANSI T1.101-1999, 1999, Publisher: American National Standards Institute.

* cited by examiner

NETWORK TIME PROTOCOL
LOOP PROCESS

SYSTEMS AND METHODS FOR SYNCHRONIZATION IN ASYNCHRONOUS TRANSPORT NETWORKS

FIELD OF THE INVENTION

The present invention generally relates to asynchronous transport networks, such as asynchronous metropolitan area network (MAN) scale systems designed for telecommunications. More particularly, the invention relates to improvements to asynchronous networks such as Ethernet networks, made by providing them with clock frequency synchronization to support circuit emulation.

BACKGROUND OF THE INVENTION

Synchronous optical networks (SONET) currently form the backbone of long haul and MAN scale telecommunication networks. However, inherently asynchronous Ethernet systems have recently penetrated into metropolitan area network design as a technological alternative to traditional SONET-based infrastructures. Ethernet is a commonly used name for a network access protocol referred to as carrier sense multiple access with collision detection (CSMA/CD). The CSMA/CD protocol is defined in ANSI/IEEE Standard 802.3, 2002 edition, published by the Institute of Electrical and Electronics Engineers, Inc., 345 East 45th Street, New York, N.Y. 10017. Advances in switching and transmission technologies combined with the introduction of 10 gigabits per second (Gb/s) Ethernet systems, have enabled carriers to offer telecommunications services at significantly lower cost compared with SONET.

SONET technology is a link-layer protocol designed for aggregation and transport of constant bit-rate (CBR) traffic over a high-bandwidth optical fiber. Further background information is found in J. Babcock, "Sonet: A Practical Perspective," Business Communication Review, vol. 20, no. 9, pp. 59-63, September 1990, which is incorporated by reference herein in its entirety. When SONET was designed, much emphasis was put into the ability to transmit data in a synchronous manner, as the dominant use for SONET was in providing links for time division multiplexing (TDM) networks, which require that one segment of a network be able to slave its clock to another.

Voice telecommunication preferentially employs TDM in order to ensure perceived continuity at the receiving end of the transmission. While appropriate for voice traffic, the use of SONET in non-voice data traffic results in poor resource utilization and high equipment and operation costs, as such continuity in delivery generally is not required. Further background information is found in A. Chapman and H. T. Kung, "Enhancing Transport Networks with Internet Protocols," IEEE Communications Magazine, vol. 36, no. 5, pages 100 and 101, May 1998, which is incorporated by reference herein in its entirety. Increasing numbers of non-voice data applications along with growing bandwidth demands and increased competition have forced carriers to challenge the traditional "dumb-pipe" MAN model and to seek lower-cost solutions.

In its evolution, Ethernet has recently reached the stage where it can be expanded from local enterprise to carrier-class networks. Three factors have enabled this expanded utilization of Ethernet technology. First, the introduction of long-haul optics has enabled Ethernet systems to reach distances of 40 kilometers (km) and higher. Second, advanced switching techniques, including multiprotocol label switching (MPLS), virtual local area networks (VLANs) and per-flow queuing, allow carriers to provide services bundled with proper security, reliability and quality of service (QoS). The latter is a measure of prioritization of telecommunications to the most time-sensitive transmissions, for example, voice communications. Finally, the introduction of 10 Gb/s Ethernet systems has provided the necessary bandwidth capacity.

From a clocking perspective, Ethernet networks are considered asynchronous, in the sense that each line card in an Ethernet switch is clocked from an independent and typically low-accuracy clock source. This clocking approach is in contrast to SONET, where all line cards are synchronized to a single master clock source, usually a port on the switch configured to be a master, and an entire network is synchronized to a primary reference source (PRS), for example an extremely accurate atomic clock. When SONET is used as a transport infrastructure for interconnecting two circuit-switched networks over a TDM link such as a T1 or T3 line, it is possible to establish a clock distribution hierarchy so that all elements in the network are synchronized to one primary clock source. The synchronization requirement comes from the telephone switch design. Specifically, the buffers implemented in telephone circuit switches are typically small and are used only to make up for the phase difference and small variations in clock frequency, creating a requirement for accurate timing synchronization across the network. Since SONET was originally designed as a transport technology for circuit switched networks, much attention in SONET design was put into addressing the synchronization issues.

On the other hand, conventional Ethernet switches are designed for non-voice data traffic, which is asynchronous by nature and eliminates the need for preserving the timing across the different line cards and switches. Indeed, the lack of synchronization requirements is one of the major factors that makes Ethernet switching equipment cheaper and simpler than SONET equipment. In view of the transition of network applications from voice to non-voice as demands for information transmission bandwidth steadily expand, as well as the ever-present market pressure to reduce operating costs, carriers have started implementing MANs based on Ethernet technology.

However, as new Ethernet-based infrastructures proliferate at the MAN carrier level, problems can arise with supporting legacy applications, such as interconnecting two TDM-based networks using an Ethernet MAN. For example, Ethernet-based carriers will desire to offer Ethernet transport services to individual enterprise customers. It should be possible to deliver such services at significantly lower cost than a traditional SONET-based carrier can offer. However, one important application for such a customer is likely to be an existing private branch exchange (PBX) telephone switch. PBX systems require a circuit-switched service such as a T1 connection, with the ability to slave its clock to the public network. Transferring that customer's business from SONET to an Ethernet system will practically require either facilitating continued operation of the PBX switch over the public network by making it compatible with Ethernet technology, or replacing the switch. The costs of meeting such requirements illustrate an important motivation for designing approaches to provide a clear-channel circuit emulation over an Ethernet-based packet switched network, with clock frequency synchronization being the critical feature of such a service. Published work and the efforts in relevant standards organizations and consortiums, such as the Internet engineering task force (IETF) and metro Ethernet forum (MEF), have specified the synchronization problem, but have offered very little or no insight into its solution. Much of the previous work has been focused on packetization techniques.

Timing synchronization has a wide range of applications, and the related concepts have been researched for several decades. Prior work that has been done includes synchronization in circuit switched networks, circuit emulation over asynchronous transfer mode (ATM), circuit emulation over Internet protocol (IP), and computer time synchronization.

Circuit switched networks evolved from a network of analog switches, which required no synchronization, to networks composed of synchronous digital switches interconnected by a synchronous digital hierarchy (SDH) of links. Further background information is found in S. Bregni, "A Historical Perspective on Telecommunications Network Synchronization," IEEE Communications Magazine, vol. 36, no. 6, pp. 158-166, June 1998, which is incorporated by reference herein in its entirety. The need for synchronization arose with the introduction of digital switches, which required that the frames arriving from different links be aligned in time in order to perform slot interchanging. With increased volume of data traffic, frequent slips in slot positioning became intolerable, imposing strict requirements on clock synchronization.

Today, all public circuit switched networks implement an approach employing a small number of highly accurate PRSs to which an entire network is synchronized through a hierarchical clock distribution topology. Besides the hierarchical master-slave distribution, it is also possible to implement mutual synchronization and a hybrid of the two, but due to their complexity these approaches have not been used except in certain special applications, such as military networks. Further background information is found in: J. E. Abate, E. W. Butterline, R. A. Carley, P. Greendyk, A. M. Montenegro, C. D. Near, S. H. Richman, and G. P. Zampetti, "AT&T's New Approach to the Synchronization of Telecommunication Networks," IEEE Communications Magazine, vol. 27, no. 4, pp. 35-45, April 1989; and D. Mitra, "Network Synchronization: Analysis of Hybrid of Master-Slave and Mutual Synchronization," IEEE Transactions on Communications, vol. 28, no. 8, pp. 1245-1259, August 1980; both of which are incorporated by reference herein in their entirety.

In a central office, the master clock is extracted directly from one of the links that connect the office to the outside network, which is usually a feed from a source on a higher clock stratum level. The Stratum 3 standard, for example, requires that during the first 24 hours the clock may not drift by more than $3.7 \times 10^{-7}$ relative to the last synchronized frequency, while any deviation for any reason may not be higher than 4.6 parts per million (ppm) of the nominal frequency. Further background information is found in American National Standard Institute, Synchronization Interface Standard, February 1994, ANSI T1.101-1994, which is incorporated by reference herein in its entirety.

Circuit emulation over ATM is an example of using a packet switched network to transport TDM traffic. TDM frames are packetized and transmitted over an ATM network using the asynchronous adaptation layer 1 (AAL-1). Further background information is found in International Telecommunications Union, B-ISDN ATM Adaptation Layer Specification: Type 1 AAL, August 1996, ITU-T I.363, which is incorporated by reference herein in its entirety. Circuit emulation in this environment differs from typical Ethernet systems in two fundamental respects. First, the ATM normally runs over SONET, which can be used as the basis for equipment synchronization. Second, ATM uses short, fixed-size cells, which make network jitter more controllable than in Ethernet networks, allowing for simple clock recovery systems.

The standardized clock recovery method in AAL-1 is the synchronous residual time stamps (SRTS) method, which relies on measuring the length of a time period defined by an equipment clock, using the network clock as a reference. Further background information is found in R. C. Lau and P. E. Fleischer, "Synchronous Techniques for Timing Recovery in BISDN," IEEE Transactions on Communications, 1995, which is incorporated by reference herein in its entirety. If the equipment clock were synchronized with the network clock, a nominal measurement would result. In the SRTS method, the difference between the nominal and actual measurement is transmitted to the slave. Assuming that the slave has access to the network clock and knowledge about the nominal period, the residual time stamp is sufficient to recover the master clock. This method is highly accurate, but assumes that ATM cells are transmitted over a synchronous network and that both the master and the slave have access to the network clock. Since ATM normally assumes the use of SONET for a physical layer, this assumption is valid for ATM, but not for Ethernet.

Adaptive clocking in AAL-1 is an alternative to the SRTS method, which does not rely on the SONET clock for synchronization. Instead, the timing is recovered by averaging the cell inter-arrival time over a long period of time, either by directly measuring the inter-arrival time or by adapting the local clock to maintain a constant receiving buffer level. This method can be used as a starting point for deriving a synchronization system for circuit emulation over Ethernet, except that the problem is much easier to handle in the ATM case, as the jitter in cell-switched networks is more controllable than in packet-switched networks. Because of the availability of the more accurate and predominantly used SRTS method, ATM equipment vendors never had the motivation to implement an accurate adaptive clocking system.

The problem of circuit emulation over IP or Ethernet is unique in the sense that there is no alternative path for receiving the clock information. The underlying transport network is fully asynchronous, so it is not possible to rely on it for clock distribution as the ATM is able to rely on SONET links. Compared to ATM, adaptive clocking is the only option here and the problem is even harder because of the variable size packets.

There are many real-time applications and protocols implemented over IP, such as the real time protocol (RTP) and various application-specific protocols for streaming multimedia applications. Further background information is found in H. Schulzrinne, S. Casner, R. Frederick, and V. Jacobson, "RTP: A Transport Protocol for Real-Time Applications," IETF RFC1889, January 1996, which is incorporated by reference herein in its entirety. However, there is a fundamental difference between them and the circuit emulation required for Ethernet MAN applications. Streaming protocols reconstruct the data stream by doing the playout with reference to the receiver local clock, which is typically a low-cost free-running clock whose accuracy is not very high. The playout using a local clock works well for human perception of a real-time stream, such as, for example, human perception of audio or video, but it is an inadequate solution if the receiver is a piece of equipment, such as a PBX for example, that requires accurate tracking of the clock on the remote side. Even in applications that connect to the synchronous TDM network, such as voice over IP (VoIP) gateways, the clock indications are not transported over the asynchronous network. Instead, both gateways are synchronized to the TDM network side assuming that the TDM subnets are not fully isolated and a common clock distribution path still exists.

Some early results on providing TDM services over IP are found in R. Noro, M. Hamdi, and J. P. Hubaux, "Circuit Emulation over IP Networks," in Proceedings of Protocols for High-Speed Networks VI, Salem, Mass., August 1999, pp. 187-201, which is incorporated by reference herein in its entirety. This article describes the use of time stamps embedded in the packets to transmit clock time indications from a master to the slave. If the clocks were perfectly synchronized and if the network delay were constant, the slave timestamps would be a linear function of master time stamps. Using this observation as a foundation, a clock recovery system estimates parameters of a linear function by minimizing the mean square error over some predefined time window and directly adjusts the slave clock using the estimated linear dependency. After some number of iterations, the slave clock time converges to the master. The results of these early findings by Noro, et al. are of background relevance, but the performance of the systems presented by Noro is insufficient to be successfully used in practical applications.

The time to converge, computational complexity and residual error all are important performance indicators. Standards compliance criteria must also be considered as an important indicator of practical value of the system. Further background information is found in: International Telecommunication Union (ITU), Telecommunication Standardization Sector, The Control of Jitter and Wonder within Digital Networks which are Based on the 1544 kbits/s Hierarchy, March 2000, ITU-T Recommendation G.824; and International Telecommunication Union (ITU), Telecommunication Standardization Sector, The Control of Jitter and Wander Within Digital Networks Which are Based on the Synchronous Digital Hierarchy (SDH), March 2000, ITU-T Recommendation G.825; both of which are incorporated by reference herein in their entirety.

Using time stamped packets for synchronization is not limited to circuit emulation. Many distributed computing applications require that the time, and in some cases the frequency, be synchronized among the nodes. The network time protocol (NTP) has been established as a standard mechanism for computer time synchronization. Further background information is found in D. L. Mills, "Improved Algorithms for Synchronizing Computer Network Clocks," IEEE/ACM Transactions on Networking, vol. 3, no. 3, pp. 245-254, June 1995 and D. L. Mills, "Adaptive Hybrid Clock Discipline Algorithm for the Network Time Protocol," IEEE/ACM Transactions on Networking, vol. 6, no. 5, pp. 505-514, October 1998, both of which are incorporated by reference herein in their entirety. In the NTP protocol, the slave initiates a request by sending a timestamped packet to the master. The master responds with a packet that carries the original slave timestamp and two additional timestamps representing the time of arrival of the request and the time when the response was sent. A fourth timestamp is the time when the response arrives back at the slave. The four timestamps are then used to adjust the slave time, with a very low computational burden.

The NTP protocol has been conventionally used to establish computer times, and many of its features have been designed to support that function. In conventional NTP used to synchronize computer time, three timestamps are recorded into each packet. Conventional NTP also employs a form of adaptive loop filter. Further, conventional NTP employs clock filtering, in other words, a system that tries to evaluate multiple clock sources and select those that are most trustworthy from the standpoint of their accuracy. For example, if one clock differs too much from the others, the NTP protocol can drop it from the list of sources used to calculate the slave clock frequency.

While efficient in synchronizing computer wall clock time to a few milliseconds accuracy, a weakness of conventional NTP is its slow convergence and its sensitivity to the propagation time. Further background information is found in D. L. Mills, "On the Accuracy and Stability of Clocks Synchronized by the Network Time Protocol in the Internet System," ACM Computer Communications Review, vol. 20, no. 1, pp. 65-75, January 1990, which is incorporated by reference herein in its entirety. The timestamps must be exchanged over a long time relative to the reference clock period, so that the actual phase and frequency error can become significantly larger than the noise introduced by side effects.

SUMMARY OF THE INVENTION

Among the several realizations of the present invention is that better systems and methods are needed to enable synchronous circuit emulation over carrier-class asynchronous transport networks such as Ethernet telecommunications systems at the MAN level to support legacy TDM applications, while enabling achievement of the cost savings and efficiencies promised by migration away from dependency on systems built with a SONET backbone. To the end of addressing such needs while providing a variety of features as further discussed below, the present invention provides advantageous techniques to address the clock synchronization problem in TDM circuit emulation over asynchronous transport networks such as Ethernet systems at the MAN carrier level.

The present invention also provides systems and methods that achieve the performance required by carrier-class networks. These systems combine time-stamp methods based on (1) modifications of the NTP together with (2) signal processing techniques applied to measured packet interarrival times. It is to be understood that the NTP for purposes of the present invention broadly includes the conventional circuits and protocols so known, modified as described in this specification. However, the NTP as employed in the present invention also extends to and includes other synchronization protocols that use implicit and/or explicit timestamps in data packets to calculate phase or frequency error, adapted according to the teachings of the present invention. The systems and methods of the present invention perform well with modest QoS requirements, requiring only switching of the TDM traffic with priority over the data traffic.

According to the present invention, it has further been found that exchanged time stamps can be used for frequency synchronization. The phase and frequency error can be calculated from such time stamps, and calculated phase error can be used to feed a phase locked loop (PLL) system in order to accurately track changes in the master clock frequency. Alternatively, a frequency error can be used to construct a frequency-locked loop (FLL) system or the two can be combined to construct a hybrid system.

The present invention provides systems for synchronizing the clock source of a local telecommunications network connected to a remote clock source through an asynchronous transport network, comprising one or more loops selected from: a holdover loop, an open loop, and/or an NTP loop.

The holdover loops of the present invention comprise a reference clock, a clock processor for producing a holdover loop signal representing a clock frequency, a comparator for comparing the holdover loop signal representing the clock frequency and a reconstructed signal representing the clock frequency, and means for converting the holdover loop signal representing a clock frequency into the clock frequency.

The open loops of the present invention comprise a reference clock, a packet arrival detector, a packet interarrival time counter, and a weighting unit, enabling the open loop to produce a signal representing the clock frequency.

The network time protocol loops of the present invention comprise a network time protocol module, an adder, and a weighting unit, enabling the network time protocol loop to also produce a signal representing the clock frequency.

Embodiments of the systems of the present invention that include both an open loop and an NTP loop may further comprise an adder for combining the signals from the open loop and the network time protocol loop representing the clock frequency. Embodiments of the systems of the present invention may further comprise one or more filters.

The present invention further provides methods of synchronizing the clock source of a local telecommunications network connected to a remote clock source through an asynchronous transport network, comprising steps of providing one or more signals selected from a holdover loop signal, an open loop signal, and/or an NTP loop signal.

The present invention further provides improved asynchronous transport networks comprising such systems and employing such methods. A more complete understanding of the present invention, as well as other embodiments, features and advantages of the invention, will be apparent from the following detailed description and the accompanying drawings.

DETAILED DESCRIPTION

An important motivation for synchronous circuit emulation over asynchronous transport networks such as Ethernet systems at the MAN carrier level is the need for such an asynchronous carrier to support legacy TDM applications. Providing TDM services to an enterprise PBX has a substantial practical value at this time, but the concept can also be adapted to address carrier level access services such as SONET over Ethernet and ultimately synchronous carrier interconnections over any asynchronous transport network. Besides telephone service, there are many data applications still in operation that depend on TDM service, including, for example, frame relay services and private line connections such as full or fractional T1 and T3 point-to-point data connections. The ability to synchronize a local clock to the network with a high degree of accuracy is required by all equipment used in these applications.

Although migrating these applications to use asynchronous transmission technology such as IP over Ethernet and VoIP would eliminate the need for circuit emulation and thus clock synchronization, this migration is not likely to happen in the foreseeable future. Users are reluctant to modify an existing, working infrastructure, as substantial system upgrades represent high up-front capital and implementation costs and often introduce unanticipated problems that can disrupt the normal operation of a business. Hence, TDM-based applications will continue to exist and new Ethernet-based carriers will need to support such services in a transparent way. Furthermore, current standardization efforts in the Internet engineering task force (IETF) pseudowire emulation edge-to-edge (PWE3) working group as well as the metro Ethernet forum indicate strong interest in implementing circuit emulation services. Further background information is found in P. Pate, X. Xiao, T. So, A. G. Malis, T. D. Nadeau, and S. Bryant, "Framework for Pseudo Wire Emulation Edge-to-Edge," IETF draft-ietf-pwe3-framework-00.txt, February 2002, which is incorporated by reference herein in its entirety.

Figure 1:
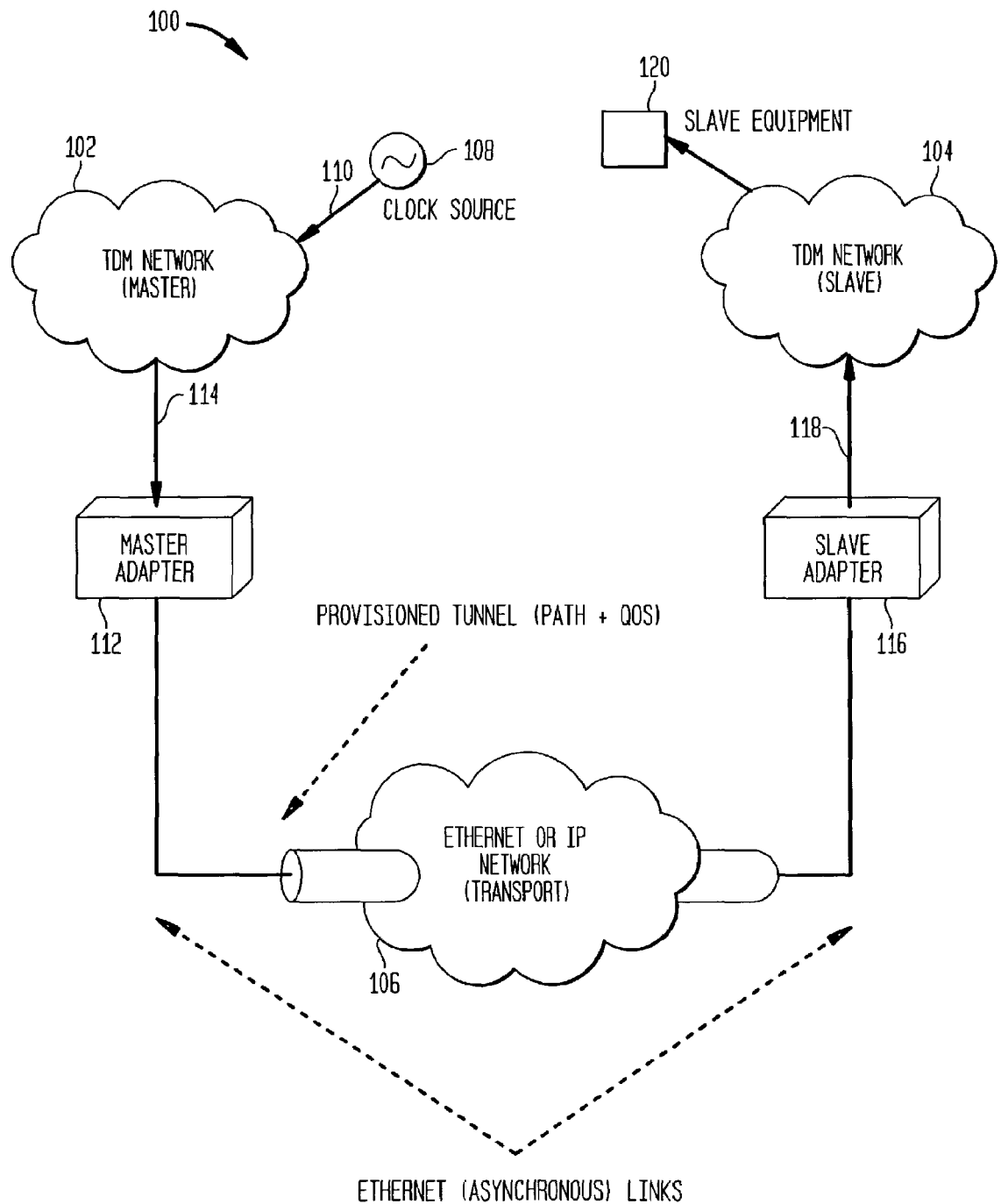
FIG. 1 is a schematic overview of a conventional network system in which a conventional asynchronous transport network has been added.

FIG. 1 shows a conventional network system 100 in which a conventional asynchronous transport network 106 has been added, into which the systems of the invention, discussed below, can be implemented. More particularly, FIG. 1 shows two conventional TDM networks 102 and 104 whose only interconnection is through a conventional asynchronous transport network 106 that cannot directly transmit clock information. This conventional asynchronous transport network 106 is, for example, an Ethernet or IP transport network. The solid arrow lines indicate the master-slave relationships with regard to the clock distribution. For example, solid arrow line 114 is the TDM link between the master TDM network 102 and its slave, the master adapter 112.

TDM network 102 synchronizes to a clock source 108 directly connected to it over a TDM link 110. The clock source 108 may either be a primary clock reference, in other words, a high precision free-running clock source such as an atomic clock, or a network clock on a higher level in the clock distribution hierarchy. All equipment inside the TDM master network 102 is synchronized to this clock source 108 through a hierarchical path of TDM links.

Access to the asynchronous transport network 106 is through adapter 112, which synchronizes its clock to the TDM master network 102 over a direct TDM connection 114. This adapter 112 is referred to herein as the master adapter. The TDM frames are encapsulated into packets and sent over the asynchronous transport network 106 to the slave adapter 116. In the transition, the explicit clocking information is lost due to the asynchronous nature of the transport network 106, and must be reconstructed at the slave adapter 116. The TDM slave network 104 synchronizes its clock to the slave adapter 116. The slave adapter 116 is connected to TDM slave network 104 through a direct TDM connection 118 and appears to TDM slave network 104 as a clock source. The clock distribution hierarchy within the TDM slave network 104 is a tree of TDM links extending to slave equipment 120, with root at the slave adapter 116. From a system perspective, all equipment inside the TDM slave network 104 is synchronized to the clock source 108 through a path that originates at the TDM master network 102, goes through the two adapters 112 and 116 and terminates in the TDM slave network 104. Since the path of this synchronization is through asynchronous transport network 106, the clock information received at slave adapter 116 is inaccurate. The systems and methods of the present invention, which are capable of reconstructing accurate clock information when applied to such a conventional network, are addressed below.

Although the discussion below will focus on application of the present invention to Ethernet carrier-class MAN-level systems, the teachings of the present invention can be extended to other types of asynchronous transport networks. More specifically, the present invention views the Ethernet network as a collection of packet-switching equipment, such as switches and routers, that relays packets from one endpoint to the other using some form of addressing. The main characteristic of such a network is that each switch or router is clocked from an independent and low-accuracy clock source. Furthermore, packets are statistically multiplexed over common transmission links with no pre-determined timeslots, such as those used in synchronous TDM networks. Any other network that exhibits said properties is considered an asynchronous network from the perspective of applicability of the present invention. A network based on the Internet protocol is one example. Another example is a resilient packet ring based on the IEEE 802.17 standard.

Figure 2:
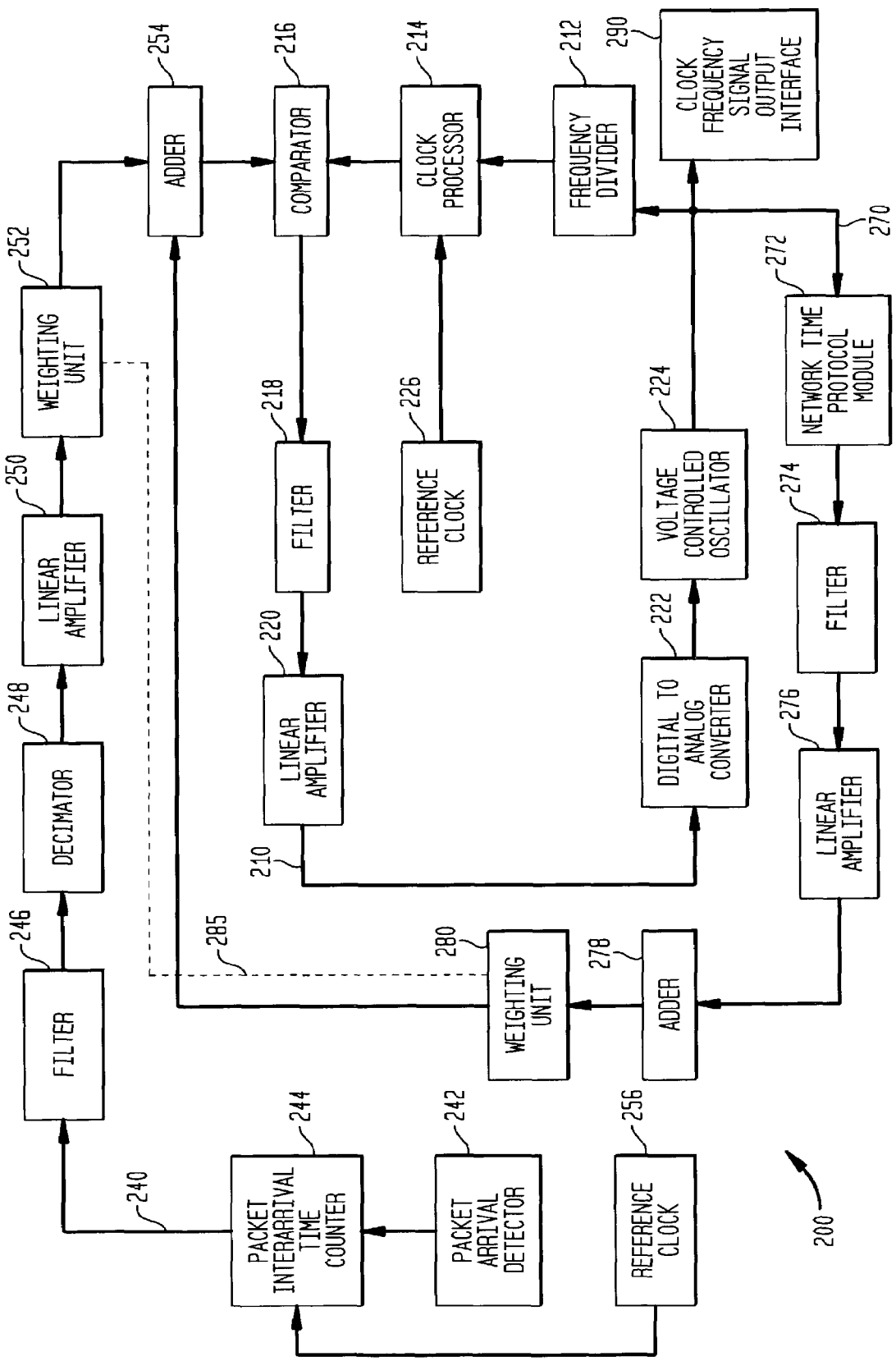
FIG. 2 is a schematic overview of an embodiment of a synchronization system according to the invention.

FIG. 2 is a schematic illustration of an exemplary system 200 according to the present invention, for time synchronized circuit emulation over an Ethernet carrier-class MAN-level system. This system generally consists of three subsystems, including a holdover loop 210, an open loop 240, and a network time protocol (NTP) loop 270.

Holdover loop 210 provides the basic operating structure for the overall system 200, and retains the last determined system clock frequency signal if asynchronous connectivity to the master network 102 is lost, thereby disabling open loop 240 and NTP loop 270. Such connectivity loss may be caused, for example, by component malfunction in master network 102, or by network outage in transport network 106. The holdover loop 210 receives input from the other two loops, namely open loop 240 and NTP loop 270. Open loop 240 provides a signal representing the reconstructed clock frequency based on measuring the interarrival times of packets carrying the TDM payload over the asynchronous transport network at the local network adapter, for example, TDM network slave adapter 116 shown in FIG. 1. Network time protocol loop 270 provides a signal representing the reconstructed clock frequency based on timestamps attached by it to data packets sent from and received by the local network adapter, for example, TDM network slave adapter 116. Timestamps can be attached either to packets carrying the TDM payload or to separate packets, the latter mode being referred to as out-of-band timestamp exchange. The open loop is immediately effective when the overall system 200 is placed in operation, providing a rough approximation of the reconstructed clock frequency. The network time protocol loop takes over the clock reconstruction function after a brief startup period, yielding a highly accurate reconstruction of the system clock frequency.

Referring to FIG. 2, the holdover loop 210 includes a frequency divider 212, a clock processor 214 implemented in this system as a clock counter, a comparator 216, a filter 218, a linear amplifier 220, a digital to analog converter 222, and a voltage controlled oscillator 224. The open loop 240 includes a packet arrival detector 242, a packet interarrival time counter 244, a filter 246, a decimator 248, a linear amplifier 250, a weighting unit 252, and an adder 254. The weighting unit is a linear amplifier with the gain factor set between 0 and 1. Network time protocol loop 270 includes a network time protocol module 272, a filter 274, a linear amplifier 276, an adder 278, and a weighting unit 280. The weighting unit is a linear amplifier with the gain factor set between 0 and 1.

The system depicted in FIG. 2 operates as follows. Referring to holdover loop 210, the clock counter 214 uses a local baseline clock frequency signal from reference clock 226 to measure the period of the clock signal at the output of a frequency divider 212. The output signal from the clock counter 214 is a digital representation of the frequency received at the clock frequency signal output interface 290 scaled by the division factor of the frequency divider 212. The signal at the output of the clock counter 214 then enters the comparator 216 which subtracts it from the signal coming from adder 254 discussed in further detail below in connection with the open loop, yielding a digital signal that represents the clock frequency error. The output signal from comparator 216 then passes through the filter 218 and the linear amplifier 220, which jointly adjust the signal level and shape to compensate the dynamics of the other components of the system.

Next, the digital output signal passes from the linear amplifier 220 into the digital to analog converter 222. The resulting analog output signal is then used to control the voltage-controlled oscillator 224. The voltage-controlled oscillator is normalized to the nominal clock frequency of the TDM slave network 104 of FIG. 1. Its output is the necessary reconstructed clock frequency signal which is then transmitted out of the overall system 200 at clock frequency signal output interface 290. The reconstructed clock frequency signal is also directed into frequency divider 212, which reduces the period of the signal by a desired factor for ease of further processing, and converts it into digital form. In summary, the holdover loop 210 operates as a feedback control system, where the output of adder 254 represents the input signal to the holdover loop 210 and determines the output frequency which is fed into the clock frequency signal output interface 290. If the clock indications received in the TDM payload from the master TDM network 102 of FIG. 1 are lost, the adder 254 maintains the last known clock frequency value and the output frequency is maintained constant to the accuracy of the local reference clock 226.

Turning to the open loop, the packet arrival detector 242 of FIG. 2 may be suitably implemented, for example, within the TDM slave network 104 and/or the slave adapter 116, both depicted in FIG. 1. The packet arrival detector 242 sends a signal to the packet interarrival time counter 244 when the arrival of a packet carrying the TDM payload is detected. The packet interarrival time counter 244 also receives a local baseline clock frequency signal from reference clock 256, which for improved accuracy can be the same unit as reference clock 226. The packet interarrival time counter 244 generates an estimate of the master clock frequency signal from the packet interarrival time data. The foundation for this approach comes from the observation that the master adapter 112 sends packets into the transport network 106 synchronously with the master clock 108. For example, the period may be every 125 microseconds assuming T1 circuit and packetization that maps one T1 frame to one Ethernet packet. On the average, packet interarrival time at the slave adapter 116 should be proportional to the period of the master clock. The variation among particular interarrival times is due to the asynchronous nature of the transport network and can be viewed as additive noise that has been superimposed to the original signal. The signal representing the reconstructed clock frequency then passes through filter 246 to remove said noise effects. If desired, the signal representing the reconstructed clock frequency then passes through decimator 248, which passes every N-th sample of the signal representing the reconstructed clock frequency through the open loop, and dumps the remaining data. N is a positive integer that represents the rate of decimation. The purpose of this step is to increase the period between transmissions of reconstructed signal data representing the clock frequency to a more manageable level. Where the decimator 248 is deployed, the filter 246 can if desired include circuitry, not shown, to further process the raw data before such dumping occurs, so that the information value of the dumped data is captured. For example, the filter 246 can include a moving average filter, which averages N samples and outputs the averaged result. In this case, the data retained after dumping reflect the dumped data on a moving average basis.

Following the filter 246, the signal representing the reconstructed clock frequency passes through linear amplifier 250, to balance the signal strength among the three subsystems in the overall system 200. Next, the signal representing the reconstructed clock frequency passes through weighting unit 252, which is a linear amplifier whose gain is set between 0 and 1. As explained above, the open loop provides a roughly approximated reconstructed signal representing the clock frequency during a brief time interval, for example, about one minute, when the overall system 200 is initially activated or is switching from one master to another. The network time protocol loop gradually takes over, providing a highly accurate signal representing the reconstructed clock frequency, but since the open loop has already provided a roughly approximate signal representing the reconstructed clock frequency, the speed of convergence for the network time protocol loop is much faster than if the network time protocol were used alone. The weighting units 252 and 280 control the required mixing of the two signals representing the reconstructed clock frequency, as the signal representing the reconstructed clock frequency from the open loop 240 enters adder 254 where it is mixed with the signal representing the reconstructed clock frequency from the network time protocol loop 270. The weighting units 252 and 280 are set so that their sum equals 1 and each of them is in the range between 0 and 1, and the values of such gains in the weighting units 252 and 280 are coordinated through a communication path between them represented by dotted line 285.

In alternative embodiments, applicable to all systems and methods discussed in this specification, the holdover loop, the open loop, and/or the network time protocol loop may be either present or omitted. For example, in embodiments where the open loop is omitted, the roughly approximated signal representing the reconstructed clock frequency generated by the open loop is not available. In such a case the network time protocol will permit the system to converge to the master, but the system will operate with degraded performance regarding the time needed to achieve such convergence.

The network time protocol loop 270 receives current signal input representing the clock frequency from the holdover loop 210. Network time protocol module 272 of FIG. 2 may be suitably implemented, for example within the TDM slave network 104 and/or the slave adapter 116, both of which are depicted in FIG. 1. The network time protocol module 272 attaches timestamps to packets, which are then sent over the asynchronous transport network 106, for example to the TDM master network 102, and then returned to the network time protocol module 272. This ongoing exchange of timestamp—labeled data packets is processed by the network time protocol module 272, yielding a phase error signal.

This phase error signal passes successively through filter 274 and linear amplifier 276, which jointly adjust the signal level and shape to compensate the dynamics of the other components of the system. The output of the linear amplifier 276 is the clock correction signal, which then enters the adder 278, where the baseline nominal clock frequency is added to the clock correction signal, yielding a signal representing the reconstructed clock frequency. This addition is necessary because the output of the linear amplifier 276 represents an adjustment with reference to the nominal frequency, while the input of the holdover loop 210 via adder 254 requires a signal which represents the desired output frequency. Next, the signal representing the reconstructed clock frequency passes through weighting unit 280. As explained above, the open loop provides an approximate signal representing the reconstructed clock frequency during a brief time interval, for example, about one minute, when the overall system 200 is initially activated or when the system is switching from one master to another. The network time protocol loop gradually takes over, providing a highly accurate signal representing the reconstructed clock frequency. The weighting units 280 and 252 control the required mixing of the two signals representing the reconstructed clock frequency, as the signal representing the reconstructed clock frequency from the network time protocol loop 270 enters adder 254 where it is mixed with the signal representing the reconstructed clock frequency from the open loop 240.

The purpose of the filters is to shape the clock correction control signal so that the effects of other components whose dynamics cannot be controlled, for example the voltage-controlled oscillator, are compensated. It is well known from control theory that not having a filter or having a badly designed filter in feedback control systems, such feedback control systems being exemplified by the holdover loop 210 and the NTP loop 270, can result in undesirable transient properties. For example, the system response may oscillate considerably before it settles to a new value, or the system may be rendered unstable. For example, the system response may wander away to a meaningless value or it may oscillate between its saturation points. However, the present invention contemplates systems that may not require one or more of the filters provided in the holdover loop, NTP loop, and/or open loop—because such undesirable transient properties either are not present, or are tolerable in the system as designed. Likewise, the methods of the present invention, discussed below in connection, for example, with FIGS. 4-7, may omit some or all of the filtration steps presented. The open loop filter has the additional function of serving as a low-pass noise filter.

In the embodiments discussed in connection with FIG. 2, the holdover loop 210 is implemented as a frequency-locked loop (FLL), and NTP loop 270 is implemented as a phase-locked loop (PLL). These loops respectively generate a "frequency error" and a "phase error." If desired, the holdover loop 210 can alternatively be implemented as a PLL. Likewise, the NTP loop 270 can alternatively be implemented as a FLL. Regarding the holdover loop 210, either a phase error signal or a frequency error signal can be input to control the VCO 224 and thereby generate a corrected clock frequency signal. Regarding the NTP loop 270, either a phase error signal or a frequency error signal can be generated. In such cases, for example, time stamps will be analyzed to produce phase error and frequency error, respectively. Whereas clock processor 214 is implemented as a clock counter where the holdover loop is designed in FLL mode, a phase comparator may be substituted in case of PLL loop mode, for comparing the holdover loop signal phase with the phase of reference clock 226. Given the foregoing interchangeability of FLL and PLL signals through such conversions, they are referred to collectively in the present invention as signals representing the clock frequency or clock frequency error.

Figure 3:
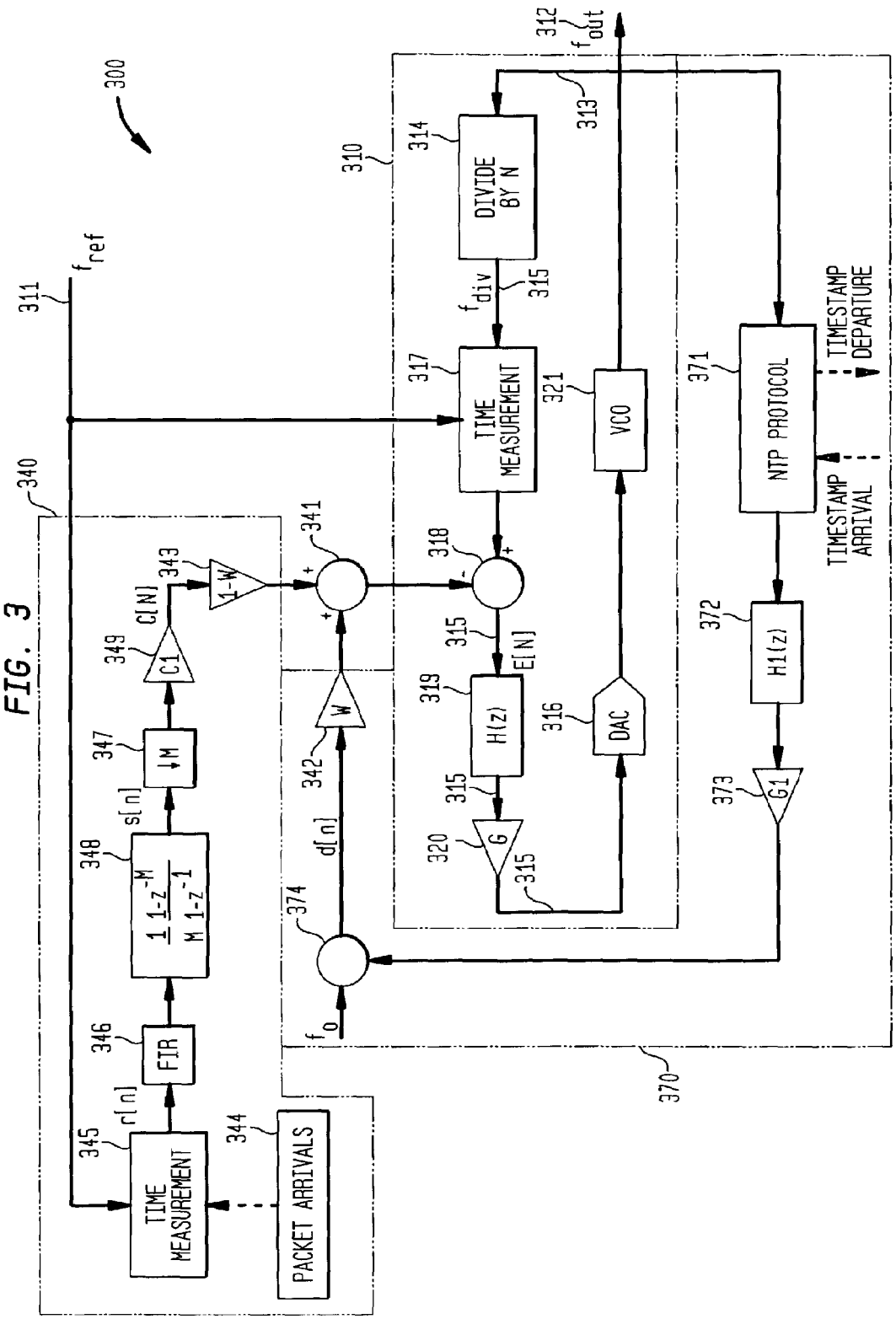
FIG. 3 is a schematic drawing of another embodiment of a synchronization system according to the invention.

FIG. 3 is an illustration of another system 300 for synchronous circuit emulation over an Ethernet carrier-class MAN-level system according to the present invention. This system consists of three subsystems demarcated by dotted lines, including holdover loop 310, open loop 340, and network time protocol loop 370.

In system 300, the holdover loop 310 includes a frequency divider 314, a digital to analog converter (DAC) 316, a time measurement block 317, a comparator 318, a filter 319, a linear amplifier 320, and a voltage controlled oscillator 321. The open loop 340 and network time protocol loop 370 are respectively connected via weighting units 343 and 342 to holdover loop 310 by adder 341. The open loop 340 includes a packet arrival detector 344, a time measurement block 345, a finite-impulse response filter 346, a moving average filter 348, a decimator 347, a linear amplifier 349, and a weighting unit 343. Network time protocol loop 370 includes a network time protocol module 371, a filter 372, a linear amplifier 373, an adder 374, and a weighting unit 342.

Holdover loop 310 provides the basic operating structure for the overall system 300. It operates as a digital frequency-locked loop (FLL), which means that it is implemented as a feedback control system in which the VCO 321 is the system under control, the filter 319 and the linear amplifier 320 constitute the controller, and the frequency error is used to construct the control signal. This holdover loop 310 receives input from a local reference source 311, typically a Stratum-N compatible free-running source, to construct the frequency error. N represents a desired Stratum level, defined by the standard, to which the system must conform when it falls back to the free-running mode. The holdover loop 310 ultimately provide a signal 312 representing the reconstructed clock frequency, also referred to as $f_{out}$, which can be conveyed, for example, as a signal representing the reconstructed clock frequency via the TDM link 118 shown in FIG. 1 to the TDM slave network 104. In a case where inputs from the open loop 340 and network time protocol loop 370 are lost due to broken connections or other system problems, the holdover loop 310 retains and continues to output its last determined correct clock frequency signal within the accuracy of a local reference oscillator.

Returning to FIG. 3, holdover loop 310 is now addressed in detail. The reconstructed system clock frequency signal 312 is conveyed by link 313 to frequency divider 314. The frequency divider 314 adjusts the period of the analog clock input to a desired and manageable level. Typically the VCO 321 would be a square-wave oscillator allowing the use of a simple counter as the frequency divider. The digital signal is conveyed from the frequency divider 314 via digital link 315, which digital link continues through the holdover loop 310 until reaching the digital analog converter 316. After exiting from the frequency divider 314, the digital signal enters the time measurement block 317, which also takes input from local reference clock 311. The time measurement block measures the digital signal from the frequency divider 314, using the frequency of the local oscillator 311 as the reference, yielding a digital representation of the clock frequency in units of the clock reference ticks. This signal then enters comparator 318, where it is subtracted from the digital output signals representing the clock frequency from the open loop 340 and network time protocol loop 370, yielding a digital clock error signal.

Next, the digital clock error signal passes into filter 319, where the signal is shaped to provide acceptable dynamic response of the overall system 300. The digital clock error signal then enters the linear amplifier 320, in which the signal units are adjusted consistent with the other subsystems. Digital to analog converter 316 then converts the digital signal into an analog signal. The analog signal is in turn directed to the voltage-controlled oscillator 321. The voltage-controlled oscillator 321 output is centered around the nominal system clock frequency, which is then modulated by the analog signal input. Hence, the output from the voltage-controlled oscillator 321 constitutes the reconstructed clock frequency signal 312, which is supplied outside of the overall synchronization system 300 as a corrected clock frequency signal. If the value represented by the input signal at the output of adder 341 increases, signifying an increase in master clock period, which in turn signifies an increase in master clock frequency, the value represented by the signal at link 315 will decrease causing the voltage-controlled oscillator (321) to reduce its frequency. The holdover loop 310, therefore, operates as a feedback system that tracks the changes in input provided by the open loop 340 and the network time protocol loop 370, while the filter 319 and the linear amplifier 320 define the dynamic response.

For example, the signal 312 representing the reconstructed clock frequency may be utilized as an input into the general framework shown in FIG. 1 directed to slave adapter 116, TDM slave network 104, or slave equipment 120 to resolve the clock error resulting from signal transmission through asynchronous transport network 106.

In this exemplary system, all signals in the holdover loop were chosen to be digital, except between the output from the voltage-controlled oscillator 321 and the frequency divider 314. This system design simplifies the required circuitry by allowing elements of the holdover loop to be implemented in the same device, for example a processor or a field-programmable gate array (FPGA), that also implements the open loop 340 and network time protocol loop 370. However, other portions of the circuitry could be designed in an analog format. In such cases, the digital to analog converter 316 may be unnecessary. Further, in alternative embodiments the frequency divider 314 is omitted, at the expense of increasing the frequency of local reference clock 311 or reducing the system precision. Although the lower-frequency signal generated by use of a frequency divider is often simpler to process further, the holdover loop could be implemented to operate on the full nominal clock frequency. In practice, the choice of whether or not to use the frequency divider 314 and the choice of a division factor to employ, reflect a tradeoff between the acceptable reference frequency 311 and the desired system precision. More specifically, a larger division factor results in larger periods, which in turn results in more reference clock ticks per one period of the signal at link 315, which further results in better system precision. If the frequency divider 314 is eliminated or the division factor is reduced, but with the desire to maintain the same precision of the reconstructed clock, the frequency of local reference 311 must be increased. Furthermore, such an increase in local reference frequency 311 makes the implementation of time measurement block 317 more challenging. In addition, although the holdover loop has been implemented as a frequency-locked loop, it could alternatively be constructed in the form of a phase-locked loop. In that case the time measurement block 317, which acts as the frequency comparator, must be replaced with a block that can provide the phase error instead of the frequency error. Further information on phase comparators and general techniques related to phase-locked loops can be found in W. F. Egan, "Frequency Synthesis by Phase Lock", Wiley-Interscience; ISBN: 0471321044; 2nd edition (November 1999) which is incorporated by reference herein in its entirety.

Open loop 340 and network time protocol loop 370 are each designed to provide a signal that represents the reconstructed clock frequency to holdover loop 310. Open loop 340 is directed to rapidly generate an approximated representation of the reconstructed clock frequency signal while network time protocol loop 370 is directed to the ongoing generation of a highly accurate digital signal representing the clock frequency following a brief initial period in which the overall system 300 is dependent on the open loop 340. The combination of the two signals representing the clock frequency, allows the system to operate with the precision of a closed-loop feedback control system, while having the speed of convergence inherent to the open-loop systems. Accordingly, the subsystems 340 and 370 are connected to the holdover loop 310 through adder 341, which ensures that the signals representing the reconstructed clock frequency from open loop 340 and network time protocol loop 370 are combined together before their comparison with the holdover loop signal representing the clock frequency at comparator 318.

Further, the signals representing the reconstructed clock frequency from open loop 340 and network time protocol loop 370 are weighted by weighting blocks 342 and 343. At the outset of operation of the overall system 300, or when the system switches over to a new master source, w=0 so that there is no input from network time protocol loop 370. As network time protocol loop 370 begins to develop accuracy following startup of system 300, the weighting units 342 and 343 are controlled by gradual adjustment to w=1 so that there is no input from open loop 340. In this manner, the overall system 300 can benefit from the roughly corrected approximated signal representing the reconstructed clock frequency provided by the open loop 340 following initial startup, as well as that from the more accurate network time protocol loop when the overall system 300 has been in operation for an adequate "warm-up" period.

Open loop 340 operates by measuring the interarrival times of packets carrying the TDM payload from the asynchronous transport network 106 of FIG. 1. Over a long period of time, such interarrival times correctly reflect the source clock frequency and can be used to reconstruct the system clock frequency signal. Referring to FIG. 3, open loop 340 includes a packet arrival detector 344. The digital output signal from the packet arrival detector 344 is conveyed to a time measurement block 345, which uses the packet interarrival times to calculate a digital signal representing the desired reconstructed clock frequency. This signal is then passed into a filter 346 to remove noise. Next, the signal is passed into a decimator 347, which retains selected sample data from the digital signal at a desired time interval in order to reduce the volume of data for further processing and also to match the sampling rate of the holdover loop 310. For example, one out of every 1,000 periodic data points could be sampled with the balance being dropped. If desired, this decimator can be preceded by a moving average filter 348, or the moving average filter and the decimator can be implemented as one block. For example, 1,000 samples can be averaged out and the averaged result can then be the output. The purpose of the moving average filter is to convert the signal data into a moving average value prior to downsampling, in order to take advantage of the information contained in data to be "dropped" before entry into the amplifier 349. Finally, the downsampled digital signal enters the linear amplifier 349, in which the signal units are adjusted consistent with the other subsystems.

In this exemplary system, all signals in the open loop were chosen to be in a digital mode following exit from the packet arrival detector 344. This system design simplifies the required circuitry. However, other portions of the circuitry could be designed in an analog format. There are many different approaches for detecting packet arrivals on an asynchronous transport network. Any system suitable to generate a digital output signal reflecting such packet arrivals can be used. The filter 346 is required to generate a reconstructed signal representing the clock frequency of acceptable quality, but in general any low-pass filter capable of providing a low cutoff frequency such as, for example, about $10^{-4} \cdot \pi$, can be used. It is understood that because the system 300 of FIG. 3 is a discrete-time system, the frequency is expressed as a normalized frequency, which is a dimensionless number in a range between 0 and $2 \cdot \pi$, with $2 \cdot \pi$ or being the Nyquist frequency.

The decimator 347 is useful, if desired, to reduce the volume of data to be processed. Its design is conventional except that data sampling rates across the overall system 300 need to be compatible and generally matched. The moving average filter 348 is appropriately used when the decimator 347 is operational. However, the moving average filter 348 may be omitted or it may be used even if the decimator 347 is omitted. The main purpose of the moving average filter 348 is simply to take advantage of the information present in the data that are subsequently dropped from the signal representing the reconstructed clock frequency by the decimator 347, although in essence it is another filter connected in series with the main FIR filter 346. Hence, other types of filters and devices for assessment of the to-be-dropped data can be substituted. Throughout this discussion, it will be appreciated that amplifiers may or may not be needed in specific systems, and may be inherently emulated by chosen system elements.

Network time protocol loop 370 includes network time protocol module 371, which uses timestamps attached to data packets to reconstruct the system clock to a higher degree of accuracy than the open loop 340. In operation, this module generates four timestamps, including T1: time in slave ticks when the NTP request departed the slave; T2: time in master ticks when the NTP request reached the master; T3: time in master ticks when the NTP response departed from the master; and T4: time in slave ticks when the NTP response reached the slave. As opposed to conventional NTP protocol known from computer time synchronization, certain simplifications are possible if such a protocol is used in the present invention. More specifically, packet transmission is deterministic, so that all but one timestamp, timestamp T3, can be deduced implicitly. Furthermore, clock selection can be eliminated. Clock selection is used when there are multiple master clock sources to which a slave may synchronize. The Stratum level of each source and its location in the network with respect to the slave may be used as the criteria for selecting which subset among all candidate sources will provide the optimal clock indications to the slave. Finally, clock filtering can also be eliminated. Clock filtering is used to further prune the list of candidate clock sources, whose clock indications may be erroneous due to transient conditions in the network, such as changes of route path, temporary delays and outages, and so on. In the MAN circuit emulation application, strictly hierarchical clock distribution, and smaller and more reliable network infrastructure, facilitate the elimination of both clock selection and clock filtering.

The network time protocol module 371 calculates the phase error among the timestamps. The phase error is then output as a digital signal and processed through a filter 372 to provide an acceptable dynamic response of the system by shaping the control signal. The filtered signal is conveyed to the linear amplifier 373, in which the signal level is adjusted, again for the purpose of tuning the dynamic system response and the control signal is thus constructed. Finally, the digital control signal is input to adder 374, which adds the nominal system frequency to the control signal. The output signal from the network time protocol loop 370 then passes through the weighting block 342 and adder 341 as previously discussed, and then enters the holdover loop 310 via comparator 318.

The design of the filter and the amplifier should be according to the well known practices of control systems theory. The common, but not exhaustive, list of design considerations include the system stability, steady-state accuracy, response time, overshoot, and settle time. The conventional NTP protocol recommends using a simple form of adaptive filtering that adjusts the bandwidth as the system converges towards its final output. In this exemplary system of the present invention, adaptive filtering poses a greater challenge due to the existence of a dual loop which increases the system order. The exemplary system presented here does not utilize adaptive filtering for the ease-of-design reasons, but that does not preclude the designer from designing an adaptive filter in the NTP loop as recommended by the conventional NTP protocol. The NTP loop can be configured either with or without adaptive filtering, and adaptive filtering can be supplied using conventional technology.

Having reviewed the exemplary overall systems 200 and 300 in conjunction with FIGS. 2 and 3, the choice and implementation of various system elements will now be discussed.

Many of the subsystem elements discussed above may be implemented using various components, for example, field programmable gate arrays (FPGAs), digital signal processors (DSPs), custom-designed very large scale integration (VLSI) devices, discrete components, general purpose processors, and software. General purpose processors are VLSI circuits that can execute the stored program providing a platform for software implementation of the system. Digital signal processors are similar to general purpose processors, but their architecture has been optimized for implementation of signal processing systems, filters for example. FPGAs are generic VLSI circuits into which a desired logic can be mapped using software tools that generate the configuration from high-level design entry such as schematic or state diagram or hardware description language, which is then programmed into the FPGA. Some FPGAs also integrate a general-purpose microprocessor, allowing for collapsing the software portions of the system along with custom-designed hardware into a single VLSI device. Digital to analog converters and voltage controlled oscillators are generally implemented as discrete components. The tradeoffs among such options are well known and relate to system complexity, time-to-market, system cost, ease of implementation, number of components that constitute the system, matching of unit production costs with volume needs, and other factors. The specific teachings throughout this disclosure are to be taken as non-limiting examples in light of such well known options.

Figure 4:
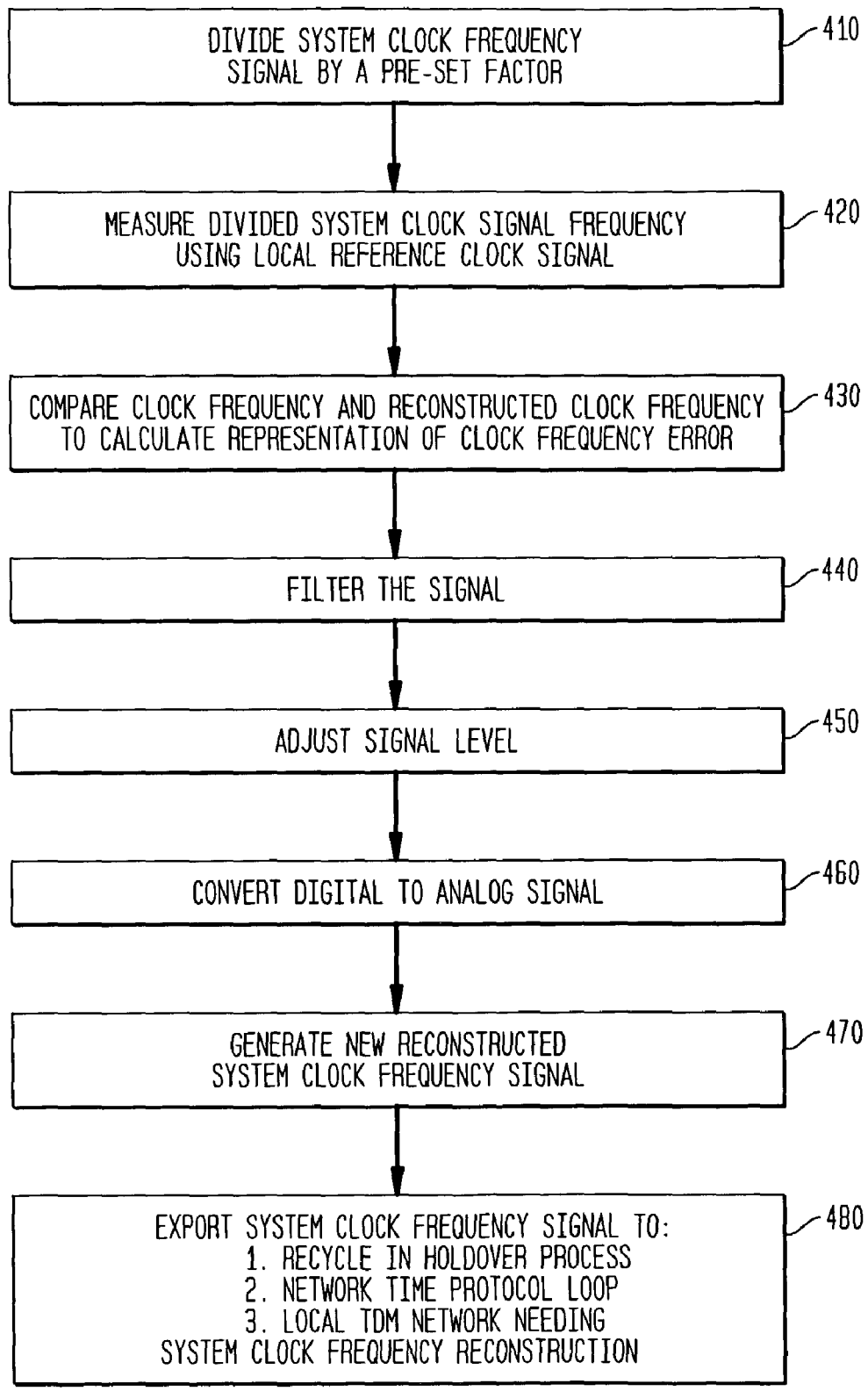
FIG. 4 is a flow chart of an embodiment of a holdover process according to the invention.

Referring now to FIG. 4, an exemplary process is shown for a holdover subsystem to be used for time synchronized circuit emulation over an Ethernet carrier-class MAN-level system according to the present invention. Although the process is an endless cycle and some or all blocks may execute in parallel either by means of designing independent circuits that operate in parallel or implementing multi-threaded software code, this discussion will begin with determination of the clock error. According to the process, in step 410 the most recent system signal representing the clock frequency present in the cycle is divided by a pre-set factor to yield a signal having a more manageable period, for example, one second. The primary meaning of a "more manageable period" is one in which there are a sufficient number of reference clock ticks so that the period can be measured more precisely. In the example where the original clock period is reduced to approximately one second, while the reference clock is oscillating at 300 MHz, the resulting measurement accuracy is on the order of magnitude of $3 \times 10^{-9}$. If the division factor and thus the average period of the measured signal are reduced, the system either loses accuracy or it may be necessary to increase the reference frequency. On the other hand, increasing the reference frequency may result in a circuit that is difficult to implement given the current state of technology. Although often desirable, for example for measurement of the frequency signal against a standard, the division step may be omitted. Next, in step 420, the system signal representing the clock frequency and a local reference clock frequency signal are both submitted to circuitry for digitally measuring the frequency of the system clock, where the system clock is the measured signal, while the local reference frequency is the signal against which the system clock frequency is measured. The weighted summation of the signal representing the reconstructed clock frequency from the open loop process and network time protocol process, is compared at step 430 with the current digital system clock frequency, and the digital clock error is calculated as the difference between the two.

In step 440, the clock error signal is filtered. Then, in step 450, any needed adjustment in signal level is made. The filtering and gain adjustment characteristics should be designed according to the commonly known practices of control systems theory. The common, but not exhaustive, list of design considerations includes the system stability, steady-state accuracy, response time, overshoot, and settle time. If the system is operating in frequency locked loop (FLL) mode as in this example, it is generally desirable to include an integration component in the filter so that the steady state error is eliminated. In step 460, the digital signal is converted to an analog signal. In general, it is desirable to design the process so that most of the steps are performed in digital mode. Appropriate circuitry can be used as desired to provide either analog or digital signals at various steps of the process. In step 470, the analog signal is used to control signal generating circuitry to produce a new signal representing the reconstructed clock frequency. Finally, at step 480, the signal representing the reconstructed clock frequency is exported to three destinations: (1) recycling into the holdover process in step 410 to begin this cycle anew; (2) commencement of the network time protocol process; and (3) the local TDM network needing system clock frequency reconstruction. In the latter, the signal representing the reconstructed clock frequency becomes the governing clock frequency signal, chronologically aligning it with remote TDM networks with which it is connected solely by asynchronous transport network linkages.

Figure 5:
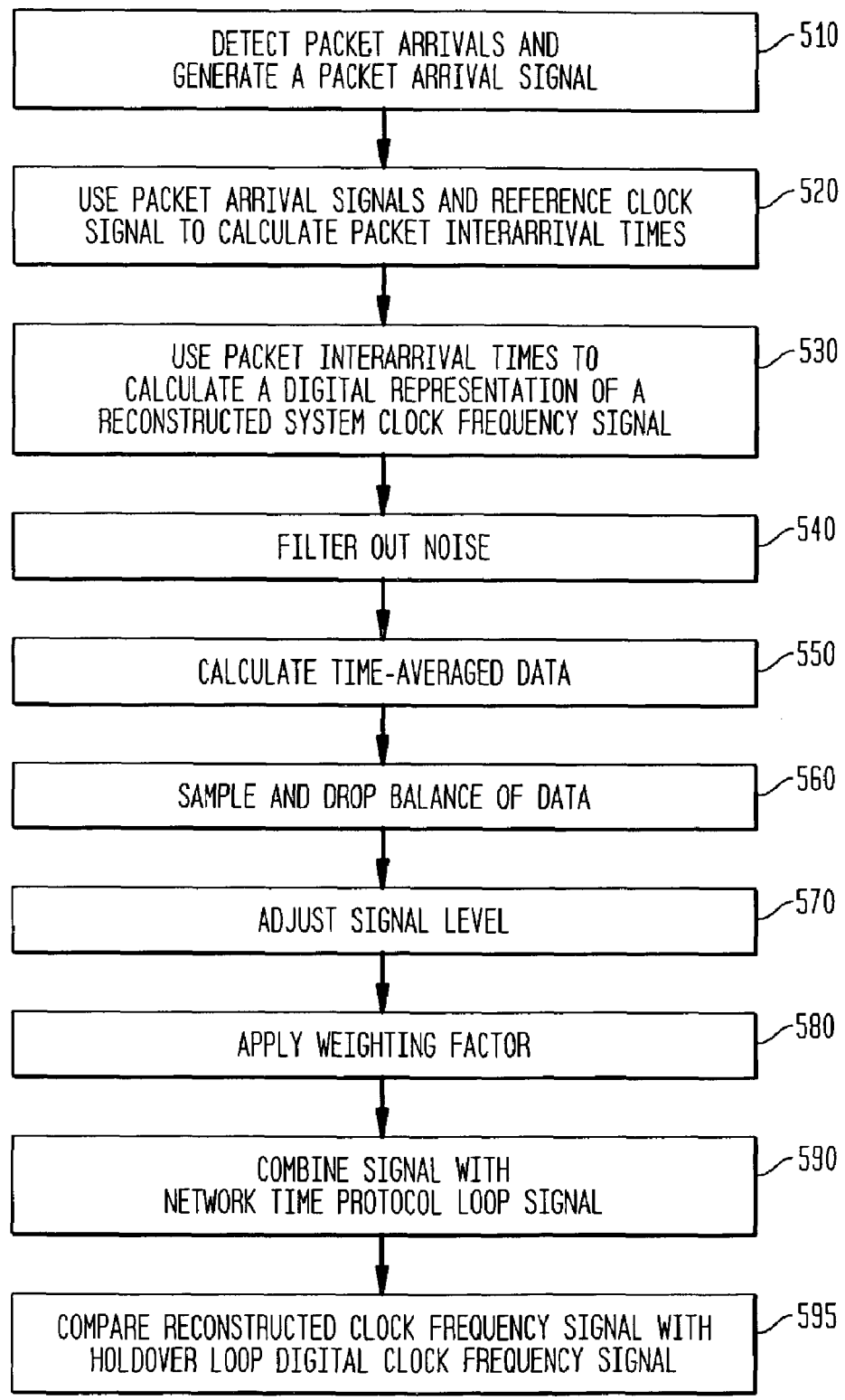
FIG. 5 is a flow chart of an embodiment of an open loop process according to the invention.

Referring now to FIG. 5, an exemplary process is shown for an open loop subsystem to be used for time synchronized circuit emulation over an Ethernet carrier-class MAN-level system according to the present invention. Beginning with step 510, packet arrivals are detected, generating a packet arrival signal. Next, in step 520 the packet arrival signals are used to calculate packet interarrival times. At step 530, a local reference clock frequency signal and the packet interarrival times are used to generate a digital signal representing the reconstructed clock frequency. Next, at step 540, noise including network jitter is filtered out of the signal. Preferably, the signal data are then subjected in step 550 to time averaging, in anticipation of downsampling. At step 560, the signal data are preferably downsampled, selected data are passed to the next step and the remainder are dropped.

Then, in step 570, any needed adjustment in signal level is made so that the signal will be of compatible magnitude with the signals from the holdover loop process and network time protocol process. In step 580, a weighting factor is applied to the signal. This weighting factor and a weighting factor separately applied in the network time protocol process, together numerically always equal one (1) and each weighting factor alone is numerically greater or equal to zero and less than or equal to 1 at any time during the system operation. As the overall process is commenced, the weighting factor applied to the open loop equals one. It is gradually decreased as the weighting factor applied to the network time protocol process is gradually increased. Next, at step 590 the weighted digital open loop frequency signal is combined with the weighted digital network time protocol frequency signal to produce a combined signal representing the reconstructed clock frequency. Finally, at step 595, the signal representing the reconstructed clock frequency is compared with the holdover loop digital signal representing the clock frequency to produce the clock error signal discussed above in connection with FIG. 4.

Figure 6:
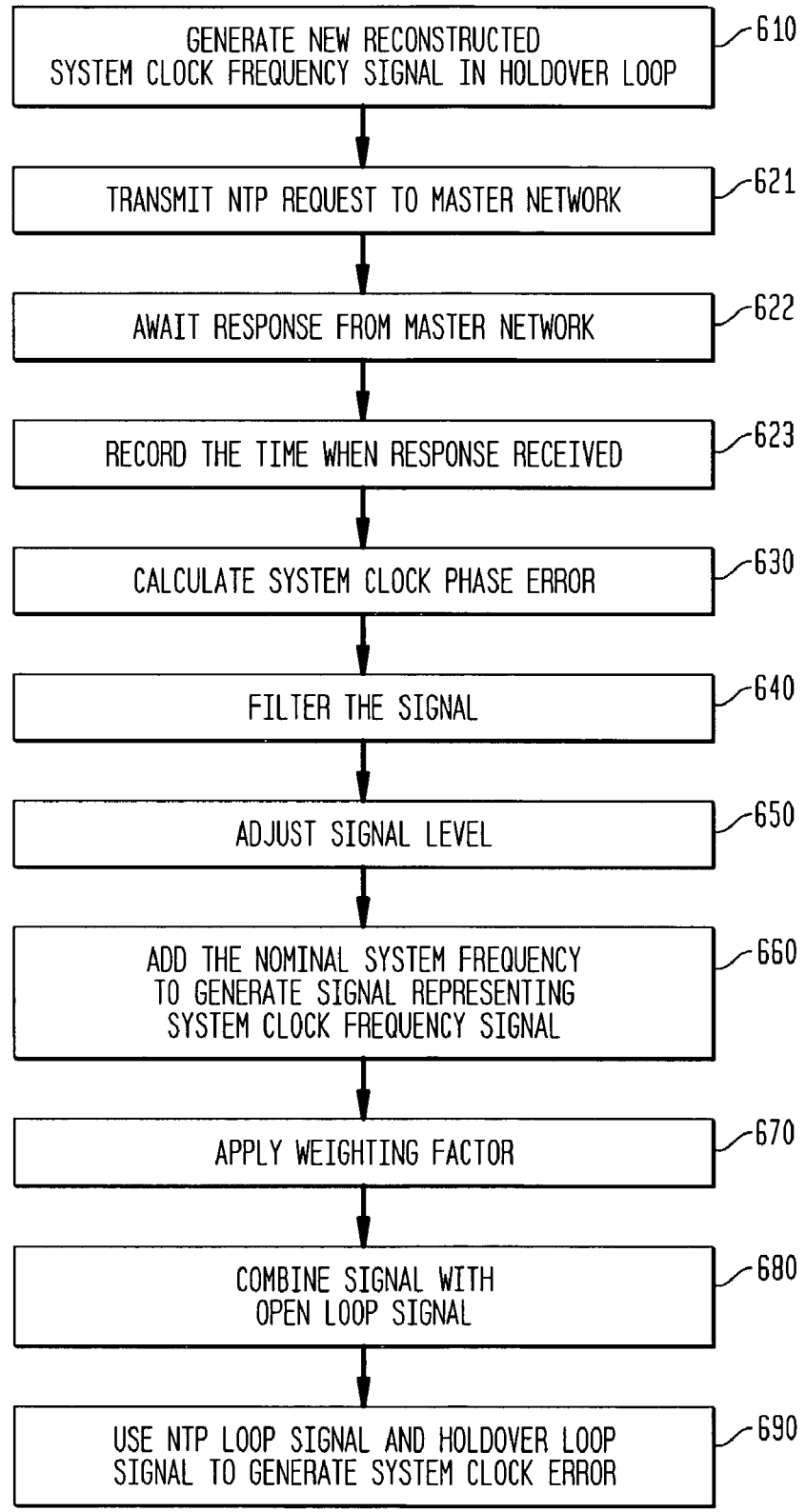
FIG. 6 is a flow chart of an embodiment of a network time protocol process according to the invention.

Referring now to FIG. 6, an exemplary process is shown for a network time protocol subsystem to be used for time synchronized circuit emulation over an Ethernet carrier-class MAN-level system according to the present invention. In step 610, the new signal representing the reconstructed clock frequency is generated in the holdover loop process. Next, timestamp data are generated using the local reconstructed clock as the reference. In step 621, a packet containing the NTP request is transmitted towards the master network 102 in FIG. 1 and the timestamp designating the time of transmission is locally recorded. Note that it is not necessary to transmit that timestamp to the master network 102. In step 622, the response from the master network 102 is awaited. The response will contain the timestamp designating the time when the corresponding request was received at the master network 102 and the sequence number from which the time of transmission of the response can be derived. The conventional NTP protocol would use a full explicit time stamp in this step, but in the circuit-emulation application, the fact that the schedule of transmissions at the master network 102 is determined by the generation of TDM frames allows for using the sequence number to deduce that time stamp and save on the overhead. The timestamp received from the master network 102 is with respect to the clock frequency running at the master to which the slave is synchronizing. In step 623, the arrival of the response is detected at the slave and the time of arrival is recorded using the local clock as the reference. In step 630, the signal representing the reconstructed clock frequency from the holdover loop process and the network time protocol data are used to calculate a digital system clock phase error signal. At steps 640 and 650, the phase error signal is shaped into the control signal. Then in step 660, the signal representing the nominal system frequency is digitally added to the frequency error signal, to generate a signal representing the reconstructed clock frequency.

In step 670, a weighting factor is applied to the signal. This weighting factor and the weighting factor applied to the open loop process, together numerically always equal one (1). As the overall process is commenced, the weighting factor applied to the network time protocol process equals zero. It is gradually increased as the weighting factor applied to the open loop process is gradually decreased. In step 680, the weighted digital open loop frequency signal is combined with the weighted digital network time protocol frequency signal to produce a combined signal representing the reconstructed clock frequency. Finally, at step 690, the signal representing the reconstructed clock frequency is compared with the holdover loop digital signal representing the clock frequency to produce the clock error signal discussed with regard to FIG. 4.

The network time protocol process can be executed either in-band or out-of-band. For in-band operation, timestamp data are concatenated with packets carrying the TDM payload and suppression of all but one timestamp is possible as the other timestamps can be deduced from sequence numbers. For out-of-band operation, timestamp packets are separately generated and transmitted separately from packets carrying the TDM payload.

Figure 7:
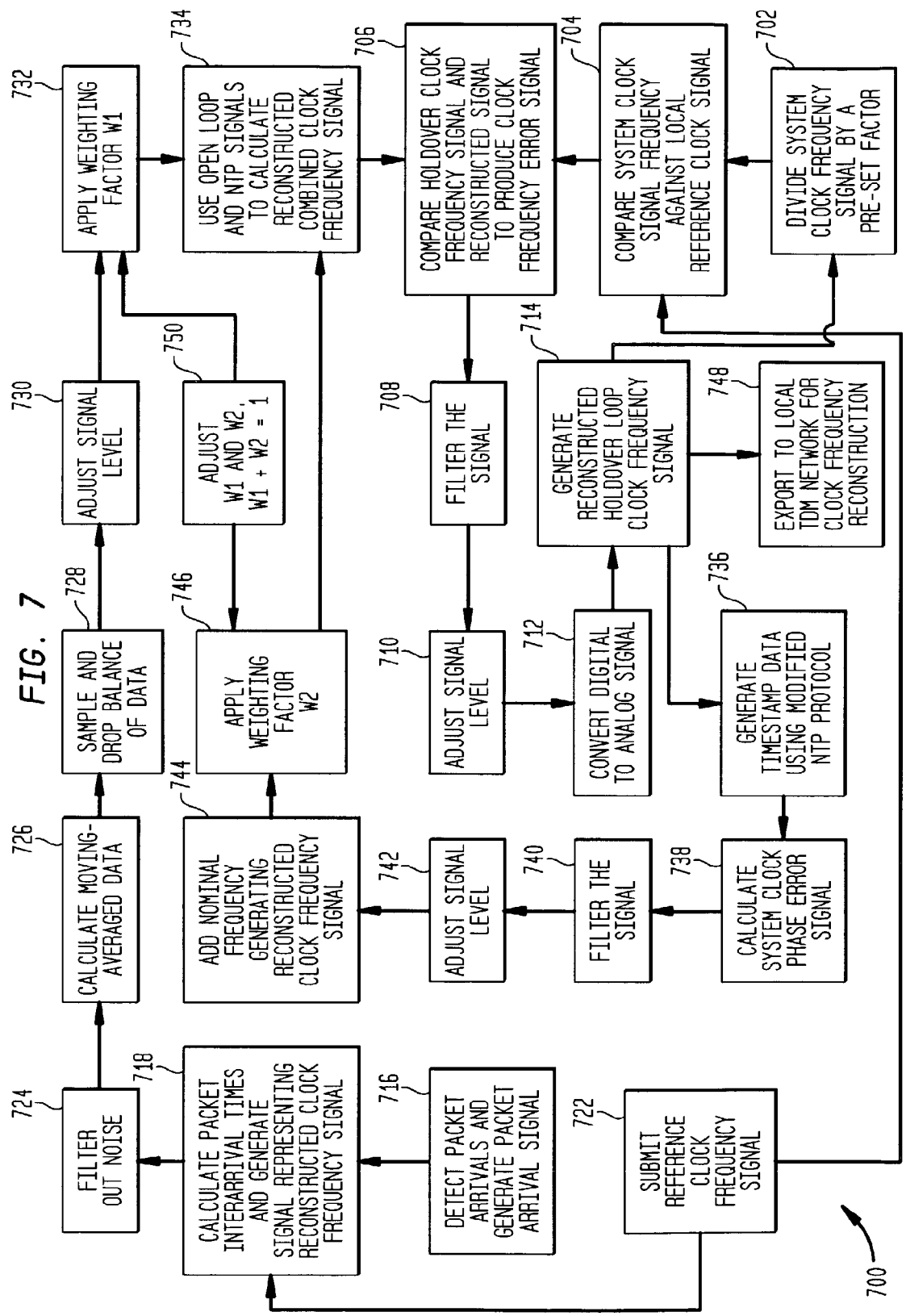
FIG. 7 is a flow chart of an embodiment of an overall synchronization process according to the invention.

Referring now to FIG. 7, an exemplary overall process 700 is shown for time synchronized circuit emulation over an Ethernet carrier-class MAN-level system according to the present invention. This process 700 comprises three subprocesses: a holdover loop process including steps 702-714; an open loop process including steps 716-734; and a network time protocol loop process including steps 736-748. One exemplary system embodiment for carrying out process 700 is the system of FIG. 3.

Process 700 begins with the holdover loop process. In step 702, the most recent signal representing the clock frequency present in the cycle is divided by a pre-set factor to yield a signal having a more manageable period, for example, one second. The objective of frequency division is to provide a sufficient number of reference clock ticks so that the period can be precisely measured. For example, if the original system clock period is reduced to approximately one second, while the reference clock is oscillating at 300 MHz, the resulting measurement accuracy is on an order of magnitude of $3 \times 10^{-9}$. If the division factor and thus the average period of the measured signal is reduced, the system either loses accuracy or may necessitate increasing the reference frequency. On the other hand, increasing the reference frequency may result in a circuit that is difficult to implement given the current state of technology. In an alternative embodiment, the signal division step is omitted, taking into account the tradeoffs between accuracy and ease of implementation.

Next, in step 704, the system clock signal frequency is measured using a local reference clock frequency signal. The reconstructed system clock frequency from the weighted combination of the open loop process and network time protocol loop process, is then compared at step 706 with the digital representation of system clock frequency, and the digital representation of clock error is calculated. In step 708, the frequency error signal is shaped using the filter to provide acceptable dynamic response of the system. Then, in step 710, any needed adjustment in signal level is made, also for the purpose of providing an acceptable dynamic system response.

In step 712, the digital signal is converted to an analog signal. In general, it is desirable to design the process so that most of the steps are performed in digital mode. However, as previously explained with regard to system embodiments, circuitry can be designed to provide either analog or digital signals at various steps of the process. In step 714, the analog signal is used to produce a new signal representing the reconstructed clock frequency. The signal representing the reconstructed clock frequency is exported to three destinations: (1) recycling into the holdover loop process to step 702 to begin this cycle anew; (2) commencement at step 736 of the network time protocol loop process; and (3) the local TDM network needing system clock frequency reconstruction, at step 748. In the latter, the signal representing the reconstructed clock frequency becomes the governing clock frequency signal, chronologically aligning it with remote TDM networks with which it is connected solely by asynchronous transport network linkages.

Turning to the open loop process shown in FIG. 7 and beginning with step 716, packet arrivals are detected, generating a packet arrival signal. In step 718, packet interarrival times are measured using the local reference clock signal submitted at step 722, and the packet interarrival times are used to generate a digital signal representing the reconstructed clock frequency. Next, at step 724, noise including network jitter is filtered out of the signal. Preferably, the signal data are then subjected to time averaging at step 726 in anticipation of downsampling. Next, at step 728, the signal data are preferably downsampled, so that selected data are passed to the next step and the remainder are dropped. Then, in step 730, signal level is adjusted so that the signal will be of compatible magnitude with the signals from the holdover loop process and network time protocol loop process. In step 732, a weighting factor is applied to the signal. Next, at step 734, the weighted digital open loop frequency signal is combined with the weighted digital network time protocol frequency signal to produce a combined signal representing the reconstructed clock frequency. Finally, at step 706, the signal representing the reconstructed clock frequency is compared with the holdover loop digital signal representing the clock frequency to produce the frequency error signal as previously discussed.

Now addressing the network time protocol loop process beginning with step 714 previously discussed, the new signal representing the reconstructed clock frequency is generated in the holdover loop process. Next, at step 736, timestamp data are generated. In particular, the network time protocol request packet is sent to the master adapter 112 of FIG. 1 and the time of sending the packet is recorded. Furthermore, the response packet is awaited, and the time stamps are extracted from the response packet. The time of arrival of the response packet is also recorded and the timestamps generated in this way are passed to step 738. In step 738, the signal representing the reconstructed clock frequency from the holdover loop process and the network time protocol data are used to calculate a digital signal representing the clock phase error. At step 740, the phase error signal is shaped by using filtering procedures to tune the system dynamic response. Next, in step 742, any needed adjustment in signal level is made for the purpose of tuning the dynamic response of the system. Then in step 744, the nominal system frequency is digitally added to the frequency error signal, to generate a signal representing the reconstructed clock frequency. In step 746 a weighting factor is applied to the signal. In step 734, the weighted digital open loop frequency signal is combined with the weighted digital network time protocol frequency signal to produce a combined signal representing the reconstructed clock frequency. Next, at step 706, the signal representing the reconstructed clock frequency is compared with the holdover loop digital signal representing the clock frequency to produce the signal representing the clock frequency error. Ultimately at step 748, the reconstructed signal representing the clock frequency is converted into a corrected clock frequency signal and is exported from the overall system to the local TDM network needing clock frequency correction.

Step 750 executes in parallel with and independently of the other steps of FIG. 7 described in previous paragraph. This step controls the gain of weighting factors W1 and W2 so that it initially sets W2 to 0 and W1 to 1 and over time it changes them so that W2 converges to 1, while W1 converges to 0, but always keeping the sum W1+W2 equal to 1. The effect of this process is that the system is initially in single-loop mode. At this point the NTP loop is open and the holdover loop is the only active loop in the system. Hence, the dominant input to the holdover loop is the open loop section, steps 716-732. Over time, the NTP loop becomes gradually closed and the input from the open loop diminishes to zero.

Specific system embodiments that have been designed, simulated and tested in the laboratory will now be discussed. These embodiments are exemplary and non-limiting, and those of skill in the art will be able to adapt these embodiments as needed in deployed systems in light of the teachings of the invention, including the broad discussion above.

Figure 8:
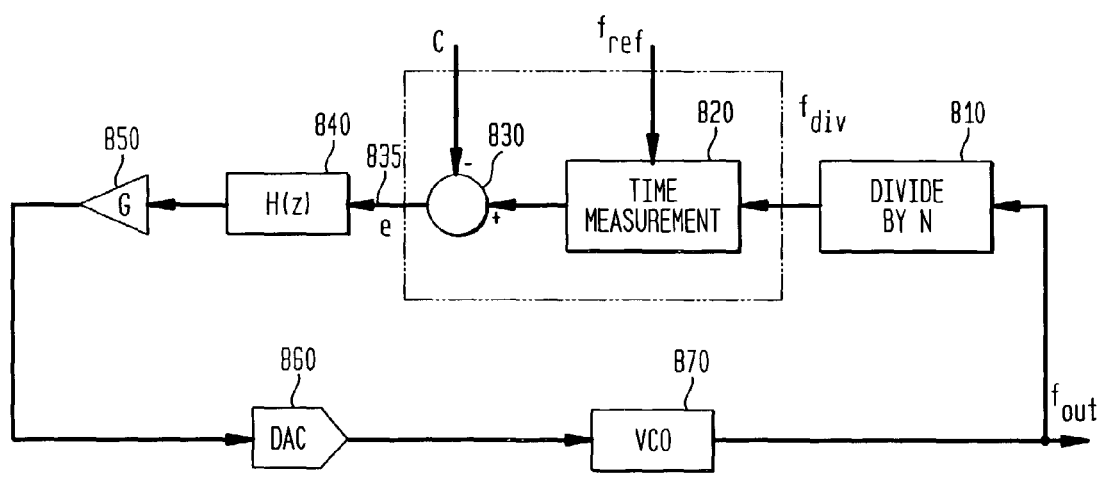
FIG. 8 is a schematic drawing of an embodiment of a holdover loop according to the invention.

Such an exemplary system will be described as a series of subsystems, in which subsystem blocks are added to the initial subsystem as their functions are explained. The system has been designed to satisfy the previously mentioned Stratum-3 compatibility requirements. When locked to the master clock source, the system conforms to the requirements set by the ITU-T G.824 recommendation. The first principle of this embodiment of the system is a digitally controlled Frequency Locked Loop (FLL) which is used for two purposes. First, it is used to maintain the last known master frequency if the reference clock indications are lost. The second purpose of the loop is to provide a building block which allows linear control of the output frequency using an offset calculated by other components in the system. In most classical digital PLL circuits and fractional-N frequency synthesizers, the output frequency is created by multiplying the reference with the control input as a non-linear operation. Further background information on such classical circuits is found in: W. C. Lindsey and C. M. Chie, "A Survey of Digital Phase Locked Loops," Proceedings of the IEEE, vol. 69, no. 4, pp. 410-431, April 1981; and B. G. Goldberg, "Programmable Fractional-N Frequency Synthesizer," U.S. Pat. No. 5,223,132, January 1992; both of which are incorporated by reference herein in their entirety. In contrast, this exemplary system of the present invention treats the input signal as a binary-encoded representation of an additive offset from the nominal frequency. In other words, other components in the system can simply calculate desired offset from the nominal frequency, present it to the holdover loop, and the output will converge to that frequency. This approach allows for software implementation of other system components. An implementation of the holdover loop is shown in FIG. 8. The system consists of a frequency divider 810, a frequency measurement block 820, a comparator 830, link 835 further discussed in connection with FIG. 9, a filter 840 depicted as H(z) designating its transfer function in z-domain, a linear amplifier (G) 850, a digital to analog converter (DAC) 860 and a voltage-controlled oscillator (VCO) 870.

Figure 9:
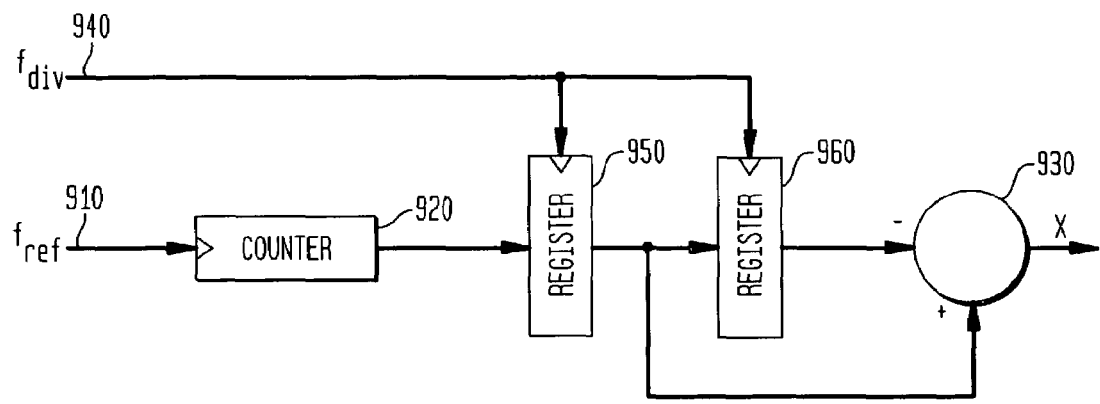
FIG. 9 is a schematic drawing of an embodiment of a time measurement block according to the invention.

The nominal center frequency of the VCO 870 and the master system frequency are both set to 1.544 megahertz (MHz), as this exemplary embodiment is for emulating a T1 link. Although this discussion is presented in the context of implementing a T1 circuit emulation over a gigabit Ethernet network, these teachings can be easily generalized to any form of circuit emulation over any packet switched network. Further, a variety of packet formats can be used for frame transport; and systems can be adapted as needed to address the effects of aggregating multiple TDM frames into one packet. The output signal frequency is divided by N and fed into the measurement block, depicted as the time measurement block 820. The sampling period for the holdover loop is chosen to be one second (1 s) which translates to a division factor of N=1,544,000. Frequency division is implemented using a counter that counts to N/2, generates a pulse at the output and resets itself to zero, followed by a flip-flop that inverts its state each time the said counter outputs a pulse, providing additional frequency division by 2 and ensuring a 50% duty cycle. The time measurement block 820 uses a local, externally generated reference ($f_{ref}$) such as, for example, a Stratum-3 compliant clock, to measure the time period of the divider output. A simplified form of a possible implementation of such a block is shown in FIG. 9. A control signal (C) 830 is subtracted from the output of the measurement block 820 shown in FIG. 8 and in detail as reference 930 in FIG. 9, to get the signal representing the frequency error.

Referring to FIG. 9, and noting that it represents a circuit that has been purposely simplified, the reference clock frequency signal 910 is input into the counter 920. Counter 920 increases its digital reading by one digit each time the reference clock frequency signal period elapses. The actual clock frequency to be measured 940 is input into registers 950 and 960. At any time instance, register 950 retains the value that was present at the counter output when the most recent rising edge of the $f_{div}$ signal occurred, while the register 960 retains the data value that was present at the counter output when the rising edge of $f_{div}$ occurred immediately before the most recent one occurred. Hence, the difference between the values retained in registers 950 and 960 respectively represents the number of reference ticks that occurred between the two rising edges of the measured clock, which in turn represents the length of the period of the measured clock in units of the reference clock. Therefore, a comparator 930 is used to calculate this difference.

It should be noted that the circuit of FIG. 9 only illustrates the principle of operation, and there are several additional considerations that need to be addressed in practice when implementing such a circuit. However, the treatment of such considerations is known to those skilled in the art of digital systems design. An illustrative, but not exhaustive, list of such considerations to be addressed include the finite number of bits in counters and registers, handling potential cases of overflow, and reliability considerations arising from the race conditions that commonly occur when two sequential digital circuits are clocked with two independent clock sources.

After selecting the division factor N of frequency division block 810 and designing the time-measurement circuit 820 as described earlier, the amplifier gain and the transfer function of the filter H(z) must be determined and a linearized model of a holdover loop is necessary to facilitate the design process, which is now presented. Assuming good stability of the reference frequency over a short measurement interval, the frequency error on link 835 shown in FIG. 8 can be written as:

$$e[n] \approx \left[ \frac{N \cdot f_{ref}[n]}{f_{ref}[n]} \right] - C[n] \tag{1}$$

The units of e[n] are clock ticks, where one tick represents the nominal period of a reference clock. The control signal is defined as $$C[n] = \frac{N \cdot f_{r0}}{f_0 + x[n]} \tag{2}$$

where $f_{r0}$ and $f_0$ are the nominal reference frequency and nominal VCO center frequency respectively, which are known to the system. The signal x[n] is a desired deviation from the nominal frequency. Neglecting the effects of rounding and combining equations (2) and (1), followed by simple algebraic manipulations, yields:

$$e[n] = \frac{N \cdot f_{r0}(1 + \delta_{ref})}{(f_0)^2} \cdot [x[n] - (f[n](1 + \delta_{ref}) - f_0)] \tag{3}$$

where $\delta_{ref}$ is the relative error of the reference frequency defined as $\delta_{ref}=(f_{ref}-f_{r0})/f_{r0}$. Defining the system output y[n]=f[n]−f$_0$, where f[n] is the VCO frequency at time n, as an offset from nominal VCO center frequency, the module encircled with a dashed line in FIG. 8 is a frequency comparator followed by a linear gain. The system can therefore be modeled as a discrete-time linear system in the schematic diagram shown in FIG. 10. This model of the system is further used to design the filter 840 and the linear amplifier 850 using methods known to the person skilled in the art of discrete-time linear systems design. Further background information is found in C. L. Phillips and H. T. Nagle, Digital Control Systems, Analysis and Design, Prentice Hall, 2nd edition, 1990, which is incorporated by reference herein in its entirety.

Figure 10:
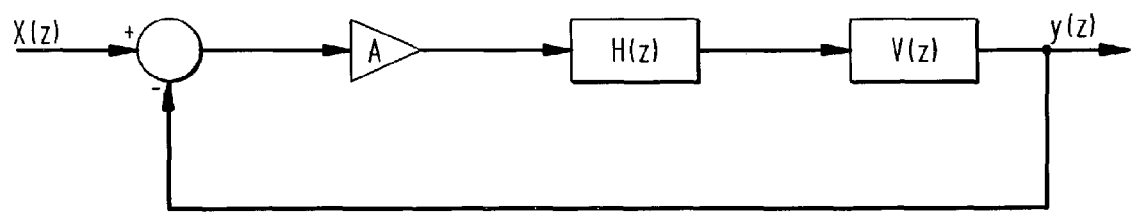
FIG. 10 is a schematic linearized model of an embodiment of a holdover loop according to the invention.

The transfer function H(z) shown in FIG. 10 is a filter that must be designed, and V(z) conceptually models the VCO dynamics along with secondary effects of other components in the system, which can be determined either analytically, experimentally, through simulations or by a combination of these three methods. Signals X(z) and Y(z) are z-transforms of the time-domain signals, x[n] and y[n], as the entire FIG. 10 is shown in z-domain. The loop gain A of FIG. 10 is related to the gain G of the amplifier 850 of FIG. 8 through equation (4), which can be derived from equation (3) and FIG. 10:

$$A = G \cdot K_v \cdot \frac{N \cdot f_{r0}(1 + \delta_{ref})}{(f_0)^2} \quad (4)$$

where $K_v$ is the gain of an ideal VCO and G is the linear attenuation/gain that must be designed along with the filter transfer function H(z). With the VCO, the reference frequency, and division factor selected, that is, N, $K_v$, $f_{r0}$, $f_0$ and worst case $\delta_{ref}$ chosen and known, it remains to design the form and parameters of the filter H(z) and the value of the gain G so that the system is stable and has an acceptable dynamic response for all possible variations of the above mentioned parameters. The form of the filter used in this exemplary embodiment is:

$$H(z) = \frac{1 - d \cdot z^{-1}}{1 - z^{-1}} \quad (5)$$

With the form of the filter selected, remaining tunable parameters are the gain (G) and the location of a zero in the loop filter (d) and the linearized model of FIG. 10 can be used to analytically determine these parameters in face of a desired dynamic response. Exemplary parameters are d=0.05 and G set so that the loop gain A=1. Although this results in a system that is slightly under damped, these parameters provides a good tradeoff between response time and overshoot.

Intuitively, performance of the holdover loop of FIG. 8 should depend on the local reference frequency. The reference frequency determines the granularity with which the error e[n] signal can be acquired. This is because the time measurement block 820 is typically implemented as a counter limited to recording an integer number of reference clock ticks, which is the reason for the floor operator, in other words the bracketed portion, in equation (1). The effect is equivalent to the quantization noise in sampled data systems, and higher frequency will result in better granularity. In the exemplary embodiment of the invention presented here, a 311.04 MHz reference is used, based on a tradeoff between the granularity and the system cost. The reference frequency has been chosen so that a standard frequency oscillator operating at an integer multiple of 19.44 MHz can be used.

The effect of a reference frequency error is twofold: it modulates the loop gain and also adds an offset to the output frequency whose relative magnitude equals the relative reference frequency error. In a closed-loop system, slight variations in loop gain do not severely affect the response as long as the system remains stable. Since the chosen parameters G and d put the operating point approximately at the center of the stability region, small variations of both parameters can be tolerated.

The NTP loop will eliminate the output offset when the system is in locked mode. However, in the holdover mode when the master clock indications are lost, the offset due to the local reference cannot be eliminated. Therefore, the accuracy and stability requirements for the local reference clock are determined by the desired stratum compatibility level.

Holdover mode is entered if a link in the path between the master and the slave network goes down or if some abnormal condition arises in the network, for example, a congestion collapse, such that the packets are dropped for an extended period of time. In such cases, the system maintains the last known master frequency by keeping the control input x[n] at the value it had the last time it was properly updated. In this mode the output clock is maintained to the accuracy of the local reference. Preferably, the local reference clock is Stratum-3 compatible, if the method of the present invention is to be implemented in carrier-class equipment.

The holdover loop presented above is itself capable of maintaining and tracking the frequency encoded by an input signal within the limits set by the accuracy and frequency of the reference clock. System components are provided that determine said input signal so that the desired output frequency is achieved. Two independent mechanisms are used for this purpose. The first mechanism implemented by the open loop is based on measuring and filtering the packet interarrival times. The second mechanism presented in further detail below in connection with discussion of the network time protocol loop uses timestamps as a method for fine-tuning the filter output.

The basic principle of the open loop is based on an observation that the rate at which the master TDM network injects packets into the asynchronous network is proportional to the master clock. Therefore, packet departure times at the master side represent master clock indications and can be used to transfer the clock information to the slave. As packets pass through an asynchronous network, their interarrival times experience two kinds of distortion.

The first and the dominant type of jitter distortion is a variable delay due to queuing. Statistics of this delay depend on the network load and the existing QoS parameters. The second and less visible type of jitter is due to the asynchronous nature of the equipment used to implement an Ethernet network. As each line card in an Ethernet switch uses an independent clock source, the relative tolerance among the clocks will be reflected in packet interarrival times even in cases when no queuing delays are present. Given the relatively small impact of jitter due to the asynchronous nature of the equipment, only queuing distortion is considered.

From the signal processing perspective, the effects of variable network delays are phenomena equivalent to superimposing the noise onto a direct current (DC) signal. If data are transmitted over a synchronous network and interarrival times plotted as a function of time, the result will be a DC signal. If packets experience variable delay, the resulting signal will still have the same DC component, but it will also have an additive zero mean noise component. If it were possible to remove the noise from the signal using a filter, the original DC signal would be extracted.

The conventional AAL-1 adaptive clocking mechanisms have used this technique, but very little attention has been paid to how to design a filter for best clock extraction performance. In some prior work, it has been incorrectly suggested that the filter design task is trivial because the network jitter is located only in high-frequency regions. Further background information on that prior work is found in H. M. Ahmed and M. G. Hluchyj, "ATM Circuit Emulation—A Comparison of Recent Techniques," in Proceedings of IEEE Globecom, 1991, pp. 370-374, which is incorporated by reference herein in its entirety. Although having a zero mean, the noise due to the network jitter starts at a very low frequency. Consequently, an extremely narrow-band low pass filter is necessary to remove this noise.

Figure 11:
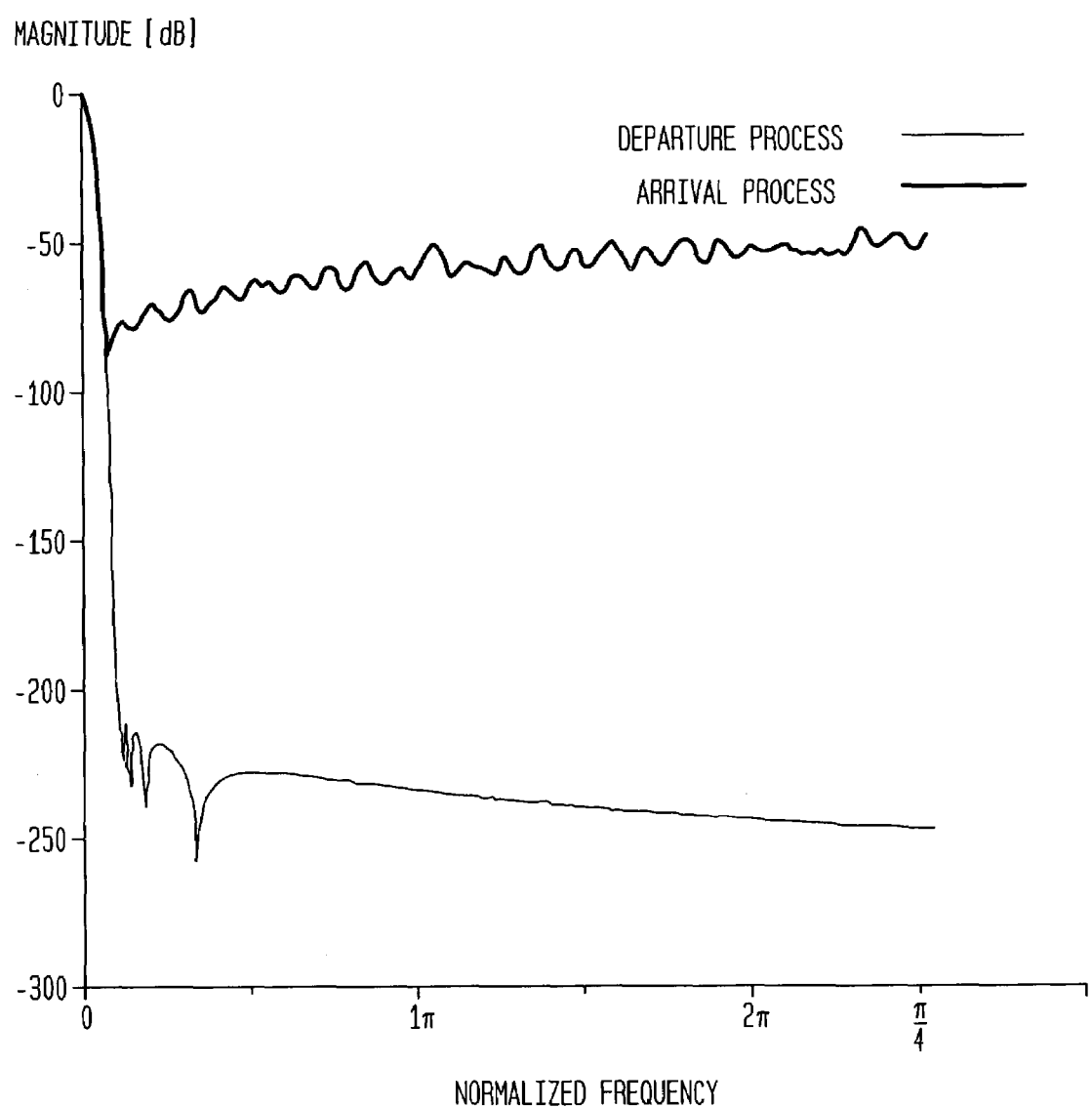
FIG. 11 is a chart comparison of the power spectrum of the arrival process at the slave side of an Ethernet MAN to the power spectrum of the departure process at the master side.

To get a sense of the type of filter necessary to extract the original DC signal, the power spectrum was constructed for a signal created by measuring the interarrival times of packets generated by a T1 CBR feed and transported over a 5-hop network loaded with background traffic. The queuing simulation was done with ns-2 software for network simulation using discrete-event approach and interarrival times were recorded at the receiving node and dumped into a file. The file was imported into MATLAB™, a software package commercially available from MathWorks Inc., useful for mathematical analysis, which was used for spectral analysis using a 2,048-point fast Fourier transform (FFT) and a 2,048-point Kaiser window signal processor with $\beta=0.25$. Further background information on ns-2 is found in L. Breslau, D. Estrin, K. Fall, S. Floyd, J. Heidemann, A. Helmy, P. Huang, S. McCanne, K. Varadhan, Y. Xu, and Haobo Y, "Advances in network simulation," IEEE Computer Magazine, vol. 33, no. 5, pp. 59-67, May 2000, which is incorporated by reference herein in its entirety. Further background information on the spectral analysis techniques used is found in A. V. Oppenheim and R. W. Shaffer, Discrete-Time Signal Processing, chapter 11, pp. 695-767, Prentice Hall, 1989; which is incorporated by reference herein in its entirety. FIG. 11 compares the power spectrum of the arrival process at the slave side, represented by the bold line, to the power spectrum of the departure process at the master side, represented by the thin line. The data are plotted as magnitude in decibels (dB) versus normalized frequency. For easier reading, only the band from 0 to $\pi/4$ is shown. The lobes in the spectrum at the master side, which should in theory be a $\delta$-pulse, are due to windowing effects of the spectral analysis method.

Each link had a 1 Gb/s capacity and was 75% loaded with background traffic. The T1 source and sink were located at nodes 1 and 5 respectively. The T1 source generated a 64-byte packet every 125 microseconds (µs) including a T1 frame plus some arbitrarily chosen overhead. A total of 150 independent exponential sources with identical statistics were distributed evenly across the 5 nodes, resulting in 30 sources per node. At each node 20% of the background traffic was sinked out and 20% of the background traffic was newly injected into the network, so that the 75% sustained load was maintained. With this setup the background traffic at each node contained an even mix of packets that had passed through only one hop and packets that had experienced queuing at multiple hops. The maximum packet size for background traffic was 1,500 bytes.

At the nodes, class-based queuing (CBQ) was used with only two classes: one class for all T1 traffic and one class for the background traffic. Further background information on CBQ is found in S. Floyd and V. Jacobson, "Link-Sharing and Resource Management Models for Packet Networks," IEEE/ACM Transactions on Networking, vol. 3, no. 4, pp. 365-386, August 1995, which is incorporated by reference herein in its entirety. An allocation of 20% of total link bandwidth was made for the class used by T1 traffic; and borrowing of the unused T1 traffic allocation of the bandwidth was permitted. The T1 traffic was always scheduled with priority over the background traffic. The main source of jitter was the non-preemptive queuing. When a T1 packet arrived at the node it would be served with priority, but it would not interrupt a transmission in progress. Therefore, the maximum packet size determined the delay jitter magnitude, which in this simulation was +/−20 µs.

FIG. 11 indicates that the noise spectrum started at very low frequencies and that an extremely narrowband filter was needed to extract the original DC signal. A low-pass filter with a cut-off frequency set to $10^{-4}\cdot\pi$ was necessary to extract the signal that could be used to recover the clock with accuracy reflecting less than 2 ppm clock error, which has been accomplished using a 2,048 tap finite impulse response (FIR) filter.

Figure 12:
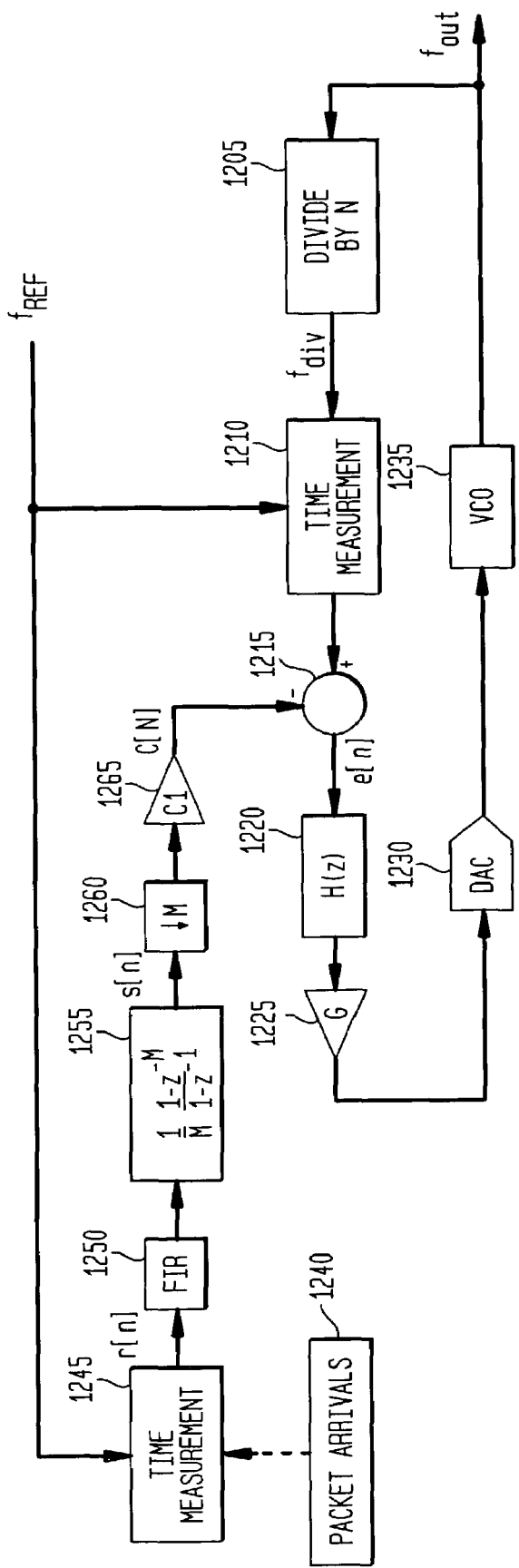
FIG. 12 is a schematic drawing of an embodiment of a combined holdover loop and open loop according to the invention.

FIG. 12 shows the system after combining the open loop with the holdover loop. The system consisted of a frequency divider 1205, a frequency measurement block 1210, a comparator 1215, a filter (H(z)) 1220, a linear amplifier (G) 1225, a digital to analog converter (DAC) 1230, a voltage-controlled oscillator (VCO) 1235, a packet interarrival detector 1240, a time measurement block 1245, a filter 1250, a moving average filter 1255, a decimator 1260, and a linear amplifier with gain $C_1$ 1265.

The interarrival times are measured using the same technique, using time measurement block 1245, and the same clock reference source as described above. The only difference between time measurement block 1245 of FIG. 12 and time measurement block 820 of FIG. 8, is in the number of bits used to represent the measurement result. While the time measurement block 820 in the holdover loop shown in FIG. 8 uses 32 bits to represent the period of the measured clock, the time measurement block 1245 of the open loop shown in FIG. 12 uses 16 bits to represent the packet interarrival times. The choice of the number of bits was governed by the typical number of ticks of the reference clock that occur within one period of the measured signal.

The output of the time measurement block 1245 represents the number of reference clock ticks that have passed between two packet arrivals. It can also be viewed as the normalized interarrival time represented in fixed-point unsigned arithmetic with all bits representing fractional binary digits. Hence, the said output can be written as $$r[n] = \frac{T[n] \cdot f_{ref}}{2^b} \qquad (6)$$

where $T[n]$ is the interarrival time of the $n^{th}$ packet in seconds, $f_{ref}$ is the reference clock frequency and b is the number of bits used by the counter. The output represented by all binary digits set to one corresponds to $r[n]=2^{b-1}/2^b\approx 1$, which represents the maximum measurable interarrival time, beyond which the result either saturates or wraps around zero. As said above, 16-bits were used to represent r[i] and the reference clock frequency was set to 311.04 MHz. With this choice, the r[i] would not saturate even if interarrival times were 125 µs±80 µs, which is four times higher arrival jitter than the maximum observed in the simulation described above.

The signal representing measured interarrival times was passed through a filter 1250 which was implemented as a 2,048-tap finite impulse response (FIR) filter with the cut-off frequency set to $10^{-4} \cdot \pi$, followed by a moving average filter 1255. The signal was down sampled by decimator 1260 and normalized using a constant gain $C_1$ in amplifier 1265. By nature of this system, the original sample rate was variable and it was determined by packet interarrival times. Every time a packet arrived, a new sample was fed into the system. On average the sample rate equals the frame departure rate which is 125 µs for the T1 case. After down sampling, the signal had the same average sampling rate as the holdover loop.

As FIG. 11 suggests, passing the signal through a filter removed the noise, which represented the contribution of the network jitter. To achieve a sufficiently narrow band, an extremely long FIR filter was used having a very low cut-off frequency. With the present state of technology, such a filter can suitably be implemented using a high-end digital signal processor (DSP) or in hardware using a custom-designed VLSI circuit or an FPGA. Theoretically, one could also implement the filter in hardware using discrete components, but due to its size (i.e., number of taps), such an implementation would be impractical. The main filtering function was provided by the FIR block 1250 and additional smoothing was provided by the moving average filter 1255 in the next stage. The length of a moving average filter equals the downsample rate of a decimator. Hence, the output of the decimator represents the mean of all samples being dropped. The rationale behind this design was that although most samples were dropped to match the rate of the holdover loop, it would be desirable to somehow embed and therefore take advantage of the information that the dropped clock indications carried. A moving average filter was one straightforward solution.

To provide proper input to the holdover loop, the constant gain $C_1$ must be determined, so that the output of a decimator approximates the equation (2). From (6), the following formula can be derived:

$$s[n] = \frac{f_{ref}}{2^b} \cdot (T[n] * h[n]) \quad (7)$$

where h[n] is an impulse response of the FIR filter and the moving average filter combined, while the symbol * designates a convolution as is well understood in the field of signal processing and linear systems theory. The output of a decimator is simply a down-sampled version of signal s[n], so at least for the purpose of calculating the gain $C_1$, the down-sampling operation can safely be ignored. By assumption based on FIG. 11, applying a filter to a signal composed of interarrival times T[n] results in an estimate of departure times at the master side, designated as $\tilde{T}_m$. Also, by definition, departure times are inversely proportional to the master clock frequency ($f_m$) and directly proportional to the length of a group of TDM frames that compose one packet ($L_{frame}$). Hence, $$\tilde{T}_m[n] = T[n] * h[n] \approx \frac{L_{frame}}{f_m[n]} \quad (8)$$

The estimated master frequency can be written as a sum of the nominal frequency and the estimated offset: $\tilde{f}_m = f_0 + \tilde{x}[n]$. Applying this definition to (8) and combining it with (2) and (7) yields:

$$C[n] = \frac{N \cdot 2^b}{L_{frame}} \cdot s[n] \quad (9)$$

Finally, the open-loop gain should be set to:

$$C_1 = \frac{N \cdot 2^b}{L_{frame}} \quad (10)$$

The equation (10) is used in design to determine the value of the open loop gain once the decimation rate N, number of bits to represent the interarrival times, and frame length are determined. The first two parameters are determined as described above, while the frame length depends on the actual TDM link emulated and the number of frames used to compose one packet. For example, if the emulated circuit type is T1 and the packetization rate is 1:1, meaning that one TDM frame constitutes one Ethernet packet, then the $L_{frame}$ equals 193.

Figure 13:
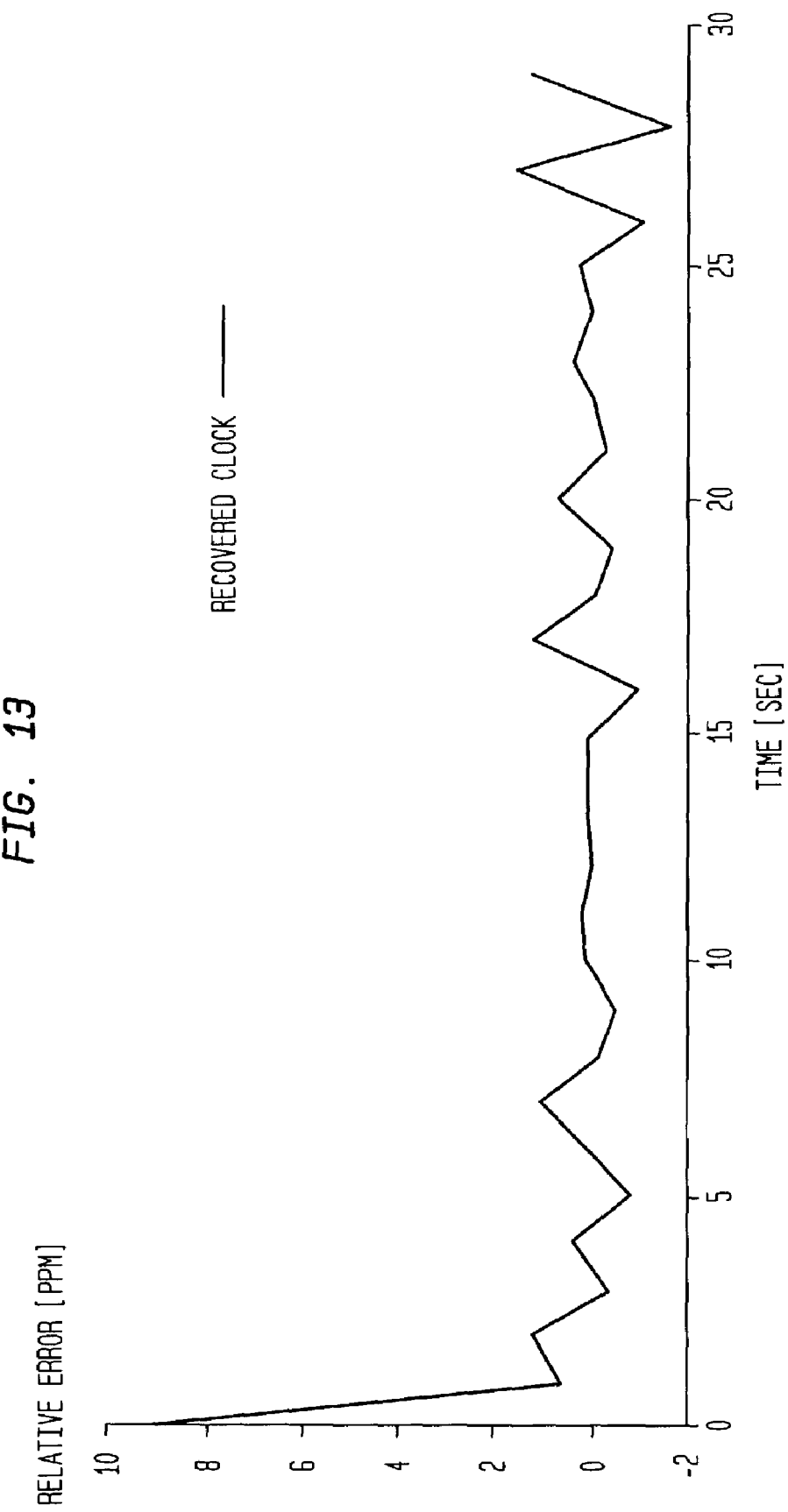
FIG. 13 is a chart showing the relative error of a clock synthesized from packet arrivals.

FIG. 13 shows the relative error $((f_{out}-f_m)/f_m)$ of the clock synthesized from packet arrivals using the same queuing simulation that was used to construct the spectrum of FIG. 11. Secondary effects such as finite precision arithmetic, non-ideal oscillators and the like have all been accounted for in the simulation. Other parameters of the simulation have been set as follows. Nominal VCO center frequency and the master frequency of the system were both set to 1.544 MHz, as a standard T1 link. Simulated initial offset of the VCO was 10 ppm from the nominal frequency. The systematic drift of the VCO was 10 ppm per day. Such a large drift is unlikely to occur in practice, but it was used to confirm the system's ability to correct for large errors. The maximum tolerated VCO deviation was 50 ppm and the performance of the VCO was linear within this range of deviation. The local reference clock was 311.04 MHz and it conformed to Stratum-3 compatibility requirements. However, the worst case was assumed, including maximum allowed drift and maximum offset from the nominal frequency. The sampling rate for the holdover loop was one second (1 s), which translates to a division factor of N=1,544,000 and a rate of decimation set to M=8,000. The FIR filter cut-off frequency was $10^{-4} \cdot \pi$ and it used 16-bit representation for the input signal and the taps. Overflow was avoided by using a 32-bit fixed-point multiply-and-accumulate (MAC) unit and ensuring that the sum of filter coefficients equaled 1 so that the filter had no DC gain. The holdover loop and the gain C1 were implemented using floating-point arithmetic. The digital to analog converter was a 16-bit unit. The above parameters were chosen to reflect a realistic system that can be implemented using low-cost components.

The results demonstrated that by using only packet arrivals to process the clock indications, it was possible to approach the master clock frequency with an accuracy reflecting less than 2 ppm error. This accuracy was still insufficient to declare a lock onto the master frequency, which is the reason for introducing the NTP loop in the system. However, the results were promising, as it was possible to suppress an extremely high noise level, recalling that the interarrival jitter was 20 μs relative to 125 μs nominal interarrival times. The residual jitter was due to the noise component that could not have been filtered, and also due to finite-precision effects. To permit the system to further converge to the master frequency, it was necessary to use explicit clock indications, such as timestamps, which system is discussed in further detail below in connection with the network time protocol.

Using the same reference source in both time measurement blocks of the system shown in FIG. 12, canceled the effects of reference instability. Combining equations (1) and (9), neglecting the effects of rounding and noting that the estimated master frequency is by definition $\tilde{f}_m = L_{frame}/\tilde{T}_m$ yields:

$$e[n] = \frac{N \cdot f_r[n]}{f_m \cdot f_{out}[n]} \cdot (\tilde{f}_m[n] - f_{out}[n]) \tag{11}$$

The resulting formula indicates that the frequency error inside the closed loop system does not depend on the reference frequency. The only effect of the reference frequency inaccuracy is through a modulation of the loop gain, which does not affect the system convergence as long as the stability is not compromised. The system was designed so that it remained stable for all loop gains in the interval of 0<A<2, with A=1 being the operating point. Tolerance of a 4.6 ppm clock error consistent with Stratum-3 requirements was safe for maintaining system stability. The loop gain was also modulated by output frequency as it converged to the master frequency, but this modulation was bounded by the VCO deviation, which was still within the safe stability range. This modulation caused slightly slower convergence than that predicted by a linear model.

The result is also intuitive, as any increase in reference frequency will cause the r[n] to increase in value which will, in turn, cause the input to the loop (c[n]) to increase. On the other hand, an increase in reference frequency will cause an increase in measured period of $f_{div}$, which will provide a negative feedback when calculating the error e[n].

Use of a modified network time protocol will now be addressed. The second mechanism used to provide a corrective input to the holdover loop was based on exchanging timestamps between the master and the slave. Timestamps can be exchanged either in band, for example as a part of a TDM frame encapsulated in an Ethernet packet, or out of band using a separate connection. In this discussion, notation similar to that of the conventional NTP protocol is used, as the whole process of using time stamps to synchronize the clock can be viewed as a special case of NTP, but it has been significantly modified according to the teachings of the invention to address synchronization of local clock frequency in contrast to conventional use for adjusting computer wall clock time.

In the past, the NTP has been mostly considered for use in the Internet environment, where propagation delay and delay variation are very large and the computer clock sources are operating with poor granularity and potentially large initial offset. There are several differences between the general NTP protocol and the one used in the present system. First, the clock distribution in the present systems was strictly hierarchical and the clock sources were considered reliable and accurate, eliminating the need to implement clock selection and filtering except for possible switchover to a backup clock source in case of a failure. Second, the main objective of circuit emulation in the present systems was synchronization in frequency, not synchronization in time as in conventional NTP deployments. Furthermore, if timestamps are exchanged in-band, they can be deduced implicitly from the frame sequence number, as the time when the master sends the response can be made deterministic. The propagation delay and delay variation in the MAN environment are much smaller then in the Internet. Initial clock offset in the present MAN simulation was within 2 ppm, and was of a magnitude determined by the open-loop. Finally, the NTP protocol dynamically adjusted the loop bandwidth as the slave clock converged to the master. Further background information on conventional NTP deployments is found in D. L. Mills, "Modeling and Analysis of Computer Network Clocks," Electrical Engineering Report 92-5-2, University of Delaware, May 1992, which is incorporated by reference herein in its entirety. Since the present system implemented two interconnected time correction loops, including the open loop and the NTP loop, the accuracy of the resulting system was higher than in the case of the modified NTP protocol alone. A single-pole, non-adaptive filter was used in the NTP loop to avoid any undesirable impact to system stability.

Figure 14:
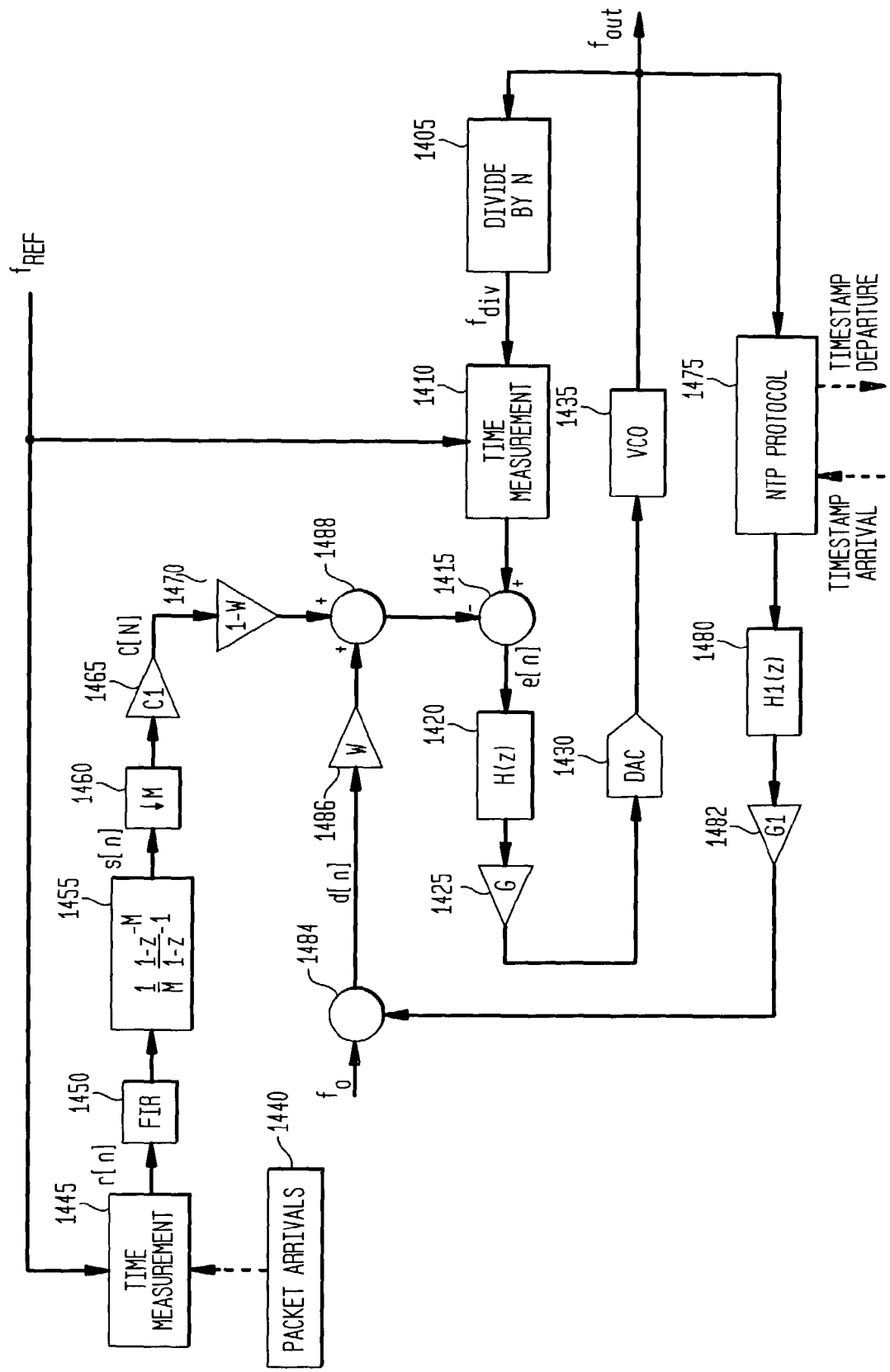
FIG. 14 is a schematic drawing of another embodiment of a synchronization system according to the invention.

The open loop alone could not itself lock the clock to the master with the necessary accuracy, but it could provide an "initial guess", after which the timestamp-based mechanism took over and completed the locking process. The timestamp-based mechanism, referred to as the NTP loop, was combined with the open loop and the holdover loop to produce the system shown in FIG. 14. The system consisted of a frequency divider 1405, a frequency measurement block 1410, a comparator 1415, a filter depicted with its transfer function H(z) 1420, a linear amplifier 1425 depicted with its gain (G), a digital to analog converter (DAC) 1430, a voltage-controlled oscillator (VCO) 1435, a packet interarrival detector 1440, a time measurement block 1445, a filter 1450, a moving average filter 1455, a decimator 1460, a linear amplifier 1465 with gain (C), a weighting unit 1470, an NTP protocol module 1475, a phase locked loop filter depicted with its transfer function H1(z) 1480, a linear amplifier 1482 depicted with its gain G1, an adder 1484, a weighting unit 1486, and an adder 1488.

With a properly tuned point in time when the NTP loop took over, the output could converge to the master quickly and with high accuracy. The corrective input for the holdover loop was a combination of the open loop output and the modified NTP protocol output. The weight factor w determined the relative contributions between the two corrective mechanisms.

Initially, w=0 so that the NTP loop was open, and no feed-back was taken from the NTP loop. The effective system elements at this point consisted of the holdover loop and the open loop. Over time, the weight factor w was gradually changed to 1 by a linear function with a slope that reached 1 after 50 seconds. Other well-known weight factor functions, such as the raised cosine function, can also be used.

Figure 15:
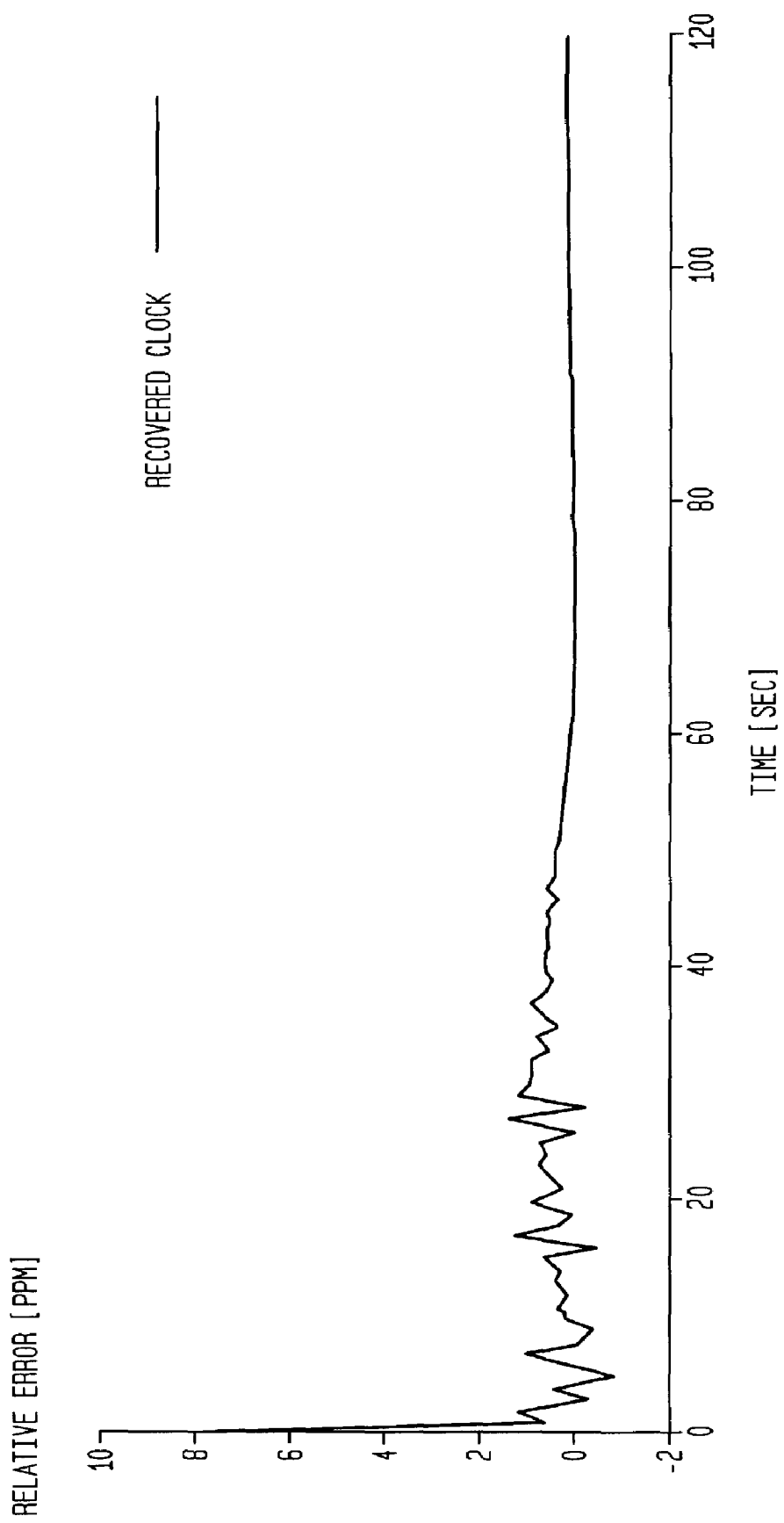
FIG. 15 is a chart showing the relative error of a clock synthesized from a full synchronization system according to the invention.

FIG. 15 shows the first 120 seconds of simulation, with the modified NTP protocol fully taking over after 50 seconds and at that point reducing the error to under 0.01 ppm. The open loop action can be observed in the beginning of this 50 second period, and that portion of the graph is similar to that of FIG. 13. The open loop action fades away over this time period and the system then becomes fully controlled by the NTP loop.

The result shown in FIG. 15 was for the same simulation parameters as those used in discussion of the open loop. For the NTP protocol, a new set of NTP timestamps was exchanged immediately following the clock update at the slave side. The time between receiving the request and sending the response at the master side was 1 second. The propagation time between the master and the slave was simulated as a random process with uniform distribution in the interval of 50 ms+/−60 µs, conservatively set to three times higher delay jitter than what was observed in the ns-2 software simulation previously described.

When the transitional period was over and the weight factor became 1, the system operated as a dual loop system where the inner loop was the holdover loop system. The outer loop was the modified NTP protocol. Four timestamps were exchanged:

$T_1$: Time in slave ticks when the NTP request departed the slave $T_2$: Time in master ticks when the NTP request reached the master $T_3$: Time in master ticks when the NTP response departed from the master $T_4$: Time in slave ticks when the NTP response reached the slave The phase error is calculated as:

$$\theta = \frac{T_2 - T_1 + T_3 - T_4}{2} \quad (12)$$

It can be shown through a series of tedious but straight-forward mathematical manipulations that the phase noise consists of an additive component, and the gain modulation. Hence, the phase error θ is determined as follows:

$$\theta = \Delta + \phi_n[n] + (1+\delta[n]) \cdot \phi_e[n] \quad (13)$$

where Δ is a constant term due to the initial difference between tick counters. This term can be made sufficiently small by first synchronizing the time at both sides before attempting to synchronize the frequency. The component $\phi_n$ is an additive phase noise due to asymmetric links, variable propagation times and frequency instabilities on both the slave and master sides. The same effects cause the loop gain to be modulated by a factor δ[n]. Finally, the desired component $\phi_e$ carries the error information used by the open loop to adjust the frequency of the slave clock. The tick counter on the slave side counts the cycles of the $f_{out}$ signal, and does not directly use the local reference. The reference clock variation will initially cause the inner loop to modify the output frequency, but the difference will be reflected through the value of timestamps and compensated on the next frequency update. In this way, the outer loop corrects any wander caused by the inner loop and allows the output to fully lock to the master frequency. This behavior is illustrated in FIG. 16 where the relative frequency error of the local reference, shown in bold, is compared to the recovered clock.

Figure 16:
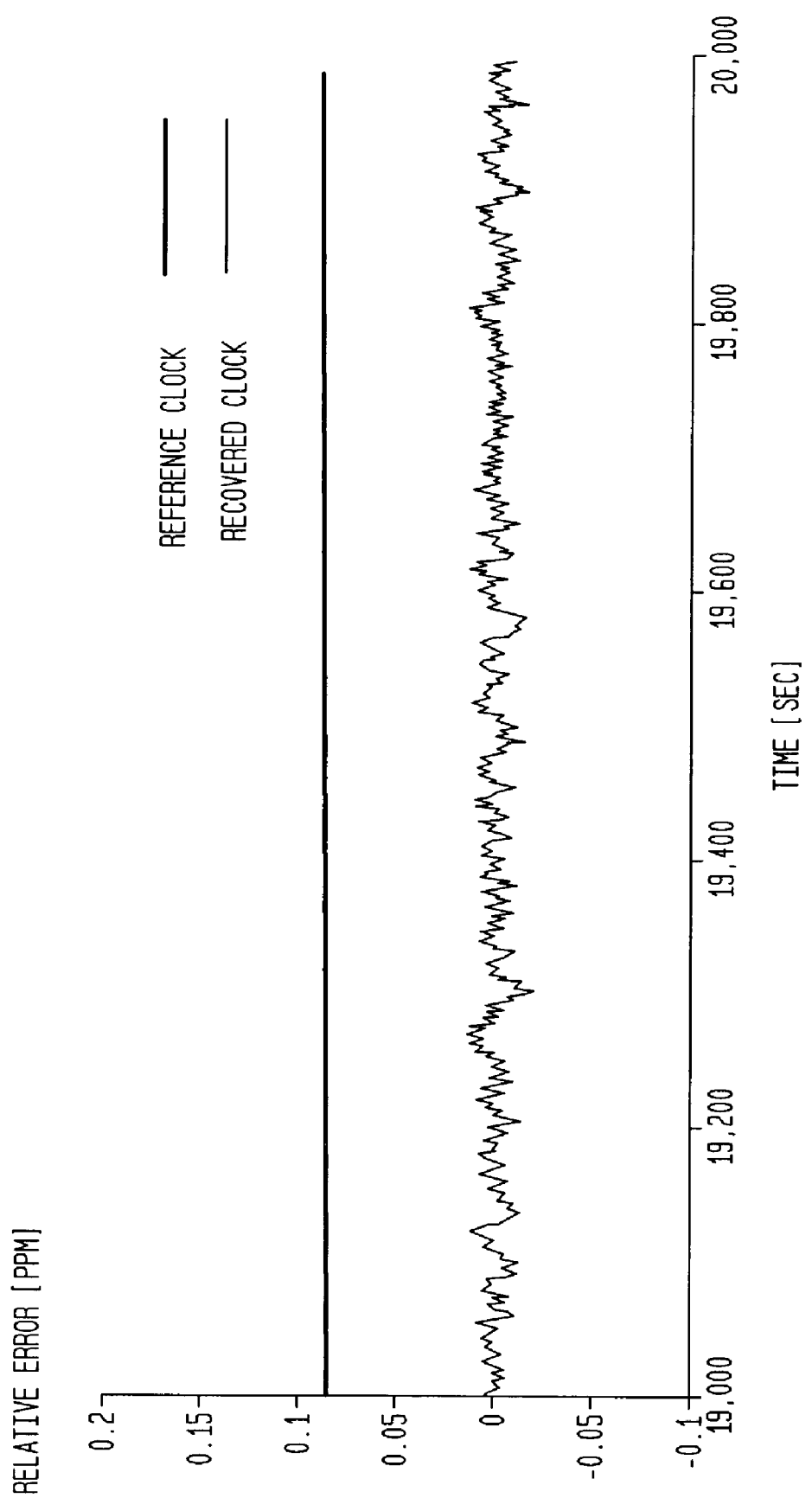
FIG. 16 is a chart showing clock drift after the first 20,000 seconds of system operation have been simulated.

FIG. 16 shows the state after 20,000 seconds, assuming that the reference clock started with zero-error and drifted over time at the rate of 0.37 ppm/day consistent with the Stratum-3 standard. After 20,000 seconds, the reference clock error was a little under 0.1 ppm and continued to drift, while the recovered clock was still oscillating around the zero mean error.

To successfully converge to the master frequency it is necessary that the desired component be significantly larger than the noise, which can be achieved if the time between receiving the NTP request at the master side and sending an NTP response is deterministic and significantly larger than the propagation time. In the MAN environment where delays are short and controllable, it is not difficult to satisfy this requirement.

Referring back to equation (12), it will be appreciated that the frequency error can be calculated by modifying the formula as follows:

$$\theta = \frac{T_2 - T_1 + T_3 - T_4}{T_3 - T_2} \quad (14)$$

Implementing the NTP loop in frequency locked mode further requires redesign of the filter and linear amplifier.

For the open loop, a single-pole infinite impulse response (IIR) filter was used, of the form:

$$H_1(z) = \frac{1-\alpha}{1-a \cdot z^{-1}} \quad (15)$$

In the holdover loop, the FLL model required an integrator with the pole at z=1 to eliminate the steady state error. In contrast, the PLL model of the modified NTP protocol was able to operate without an integrator. Phase calculation, accumulating ticks on the master and slave sides, already performs an integration function. It was empirically determined that the dual loop behaved best with parameters set to α=about 0.1 and $G_1$=about 0.08.

Figure 17:
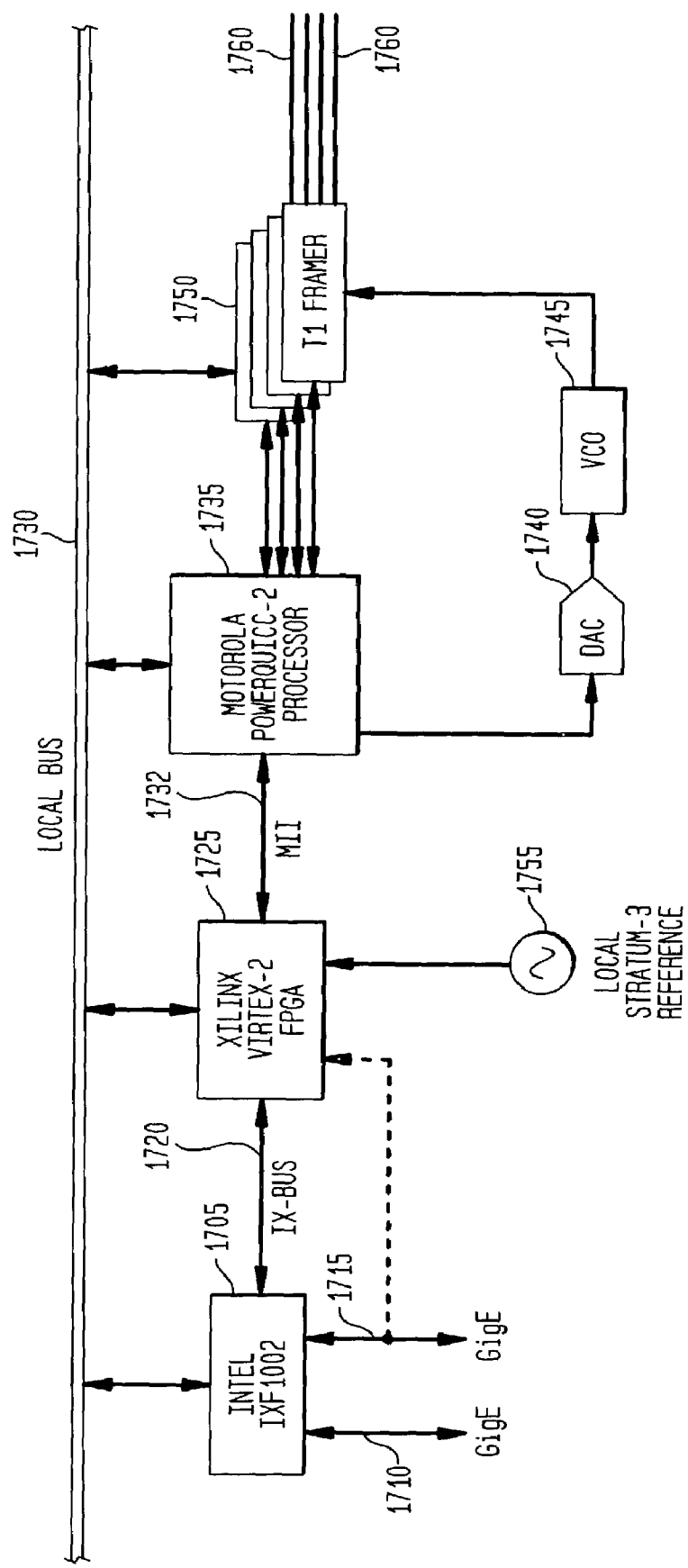
FIG. 17 is a schematic drawing of an interface between an Ethernet MAN and a TDM network according to the invention.

FIG. 17 illustrates the hardware architecture of a prototype system that implemented the methods of the present invention. The system consisted of processor 1735 from the PowerQUICC-2® family made by Motorola such as models no. MPC8255 or MPC8260, FPGA 1725 from the Xilinx Virtex-2® family, a dual gigabit Ethernet controller 1705 from Intel, model no. IXF1002, a Stratum-3 compliant oscillator 1755, a digital to analog converter 1740, a VCO 1745 and T1 framers 1750. The system provides four T1 interfaces 1760 for connecting TDM equipment on the customer's premises and two gigabit Ethernet interfaces 1710 and 1715, where the former is used to connect data equipment on the customer's premises, while the latter is used to connect to the public Ethernet MAN.

The particular processor was chosen as it conveniently integrated T1 interfaces with Ethernet interfaces in a single chip, allowing for a small number of external components, and provided sufficient computing capability to execute the software code implemented according to the present invention. Further background information on this processor is found in "PowerQUICC II® Integrated Communications Processor Family," Motorola Fact Sheet, 2001, Rev. 3, which is incorporated by reference herein in its entirety. The FPGA implemented the packet arrival detector, time measurement blocks of both the open loop and the holdover loop, open loop filter, moving average filter, decimator and the frequency divider for the holdover loop in accordance with the systems of the invention discussed above. The FPGA also handled packet multiplexing and demultiplexing between the TDM traffic and data traffic. Packets carrying the TDM payload were relayed to the processor 1735 over the MII interface 1732, while the packets carrying the data were sent back to the other gigabit Ethernet interface of Ethernet controller 1705 over the IX BUS™ 1720. The microprocessor 1735 performed TDM packetization and multiplexing among T1 ports and also ran the remaining parts of the system according to the present invention, which included the filters in the NTP loop and holdover loop, the amplifiers and the weighting units. The results from the sections of the system implemented in FPGA were available to the processor over the local bus 1730. The processor 1735 also executed miscellaneous system management functions and utilized the local bus 1730 to access the external components.

So far the system and simulation results have been presented, indicating that it is possible to synchronize to the master clock with a high degree of accuracy. In locked mode the relative error between the recovered clock and the master clock was on the order of magnitude of $10^{-8}$ at any time, in other words 0.01 ppm, and when averaged over a long period of time the error approached $10^{-11}$. Testing carried out on the system against performance requirements set by the standards for synchronous networks will now be discussed. Of specific interest are the measures of clock wander performance, namely the maximum time interval error (MTIE) and the time deviation (TDEV).

Physically, the maximum time interval error represents a measure of how much a buffer will tend to overflow or starve if data are sourced synchronously with a wander-free clock and sinked synchronously with the clock under test. Maximum time interval error is defined as the maximum difference between the maximum and the minimum time error function within any time window $\tau=n\tau_0$, also referred to as "the observation time":

$$MTIE(n\tau_0) = \max_{1 \leq k \leq N-nk} [\max_{k \leq i \leq k+n} \chi_i - \min_{k \leq i \leq k+n} \chi_i] \quad (16)$$

The system is normally analyzed as a sampled data system with $\tau/0$ being the sample period. The time error function $x_i=x(i\tau_0)$ represents the difference between the time measured with reference to an ideal clock, and the same time measured with reference to the clock under test. Lower MTIE indicates better performance.

The MTIE was measured for observation times between 2 and 10,000 seconds. Since the system updates the VCO once per second, the clock wander performance within time intervals shorter than 1 second cannot be guaranteed with the system. Instead, the performance within such intervals must be ensured by selecting a VCO with appropriate wander performance. Since the low-wander VCO requirement is only for short observation times, such requirement should not be a problem in practice.

Figure 18:
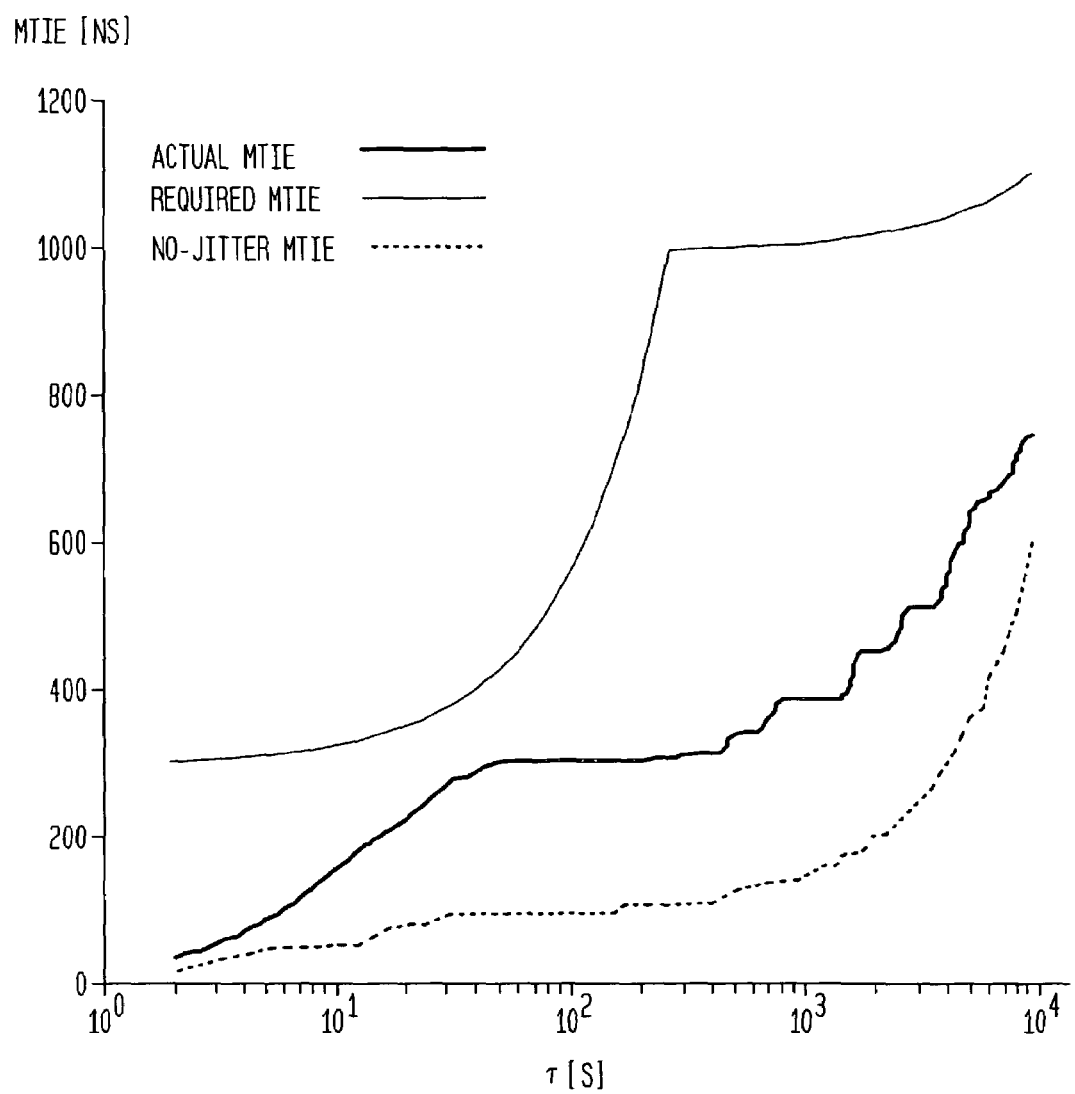
FIG. 18 is a chart showing maximum time interval error.

FIG. 18 compares the observed MTIE performance to the requirements of the ITU-T G.824 recommendation. Observed MTIE performance is indicated by a bold line, and the requirements of the ITU-T G.824 recommendation are indicated by a thin line. The graph shows that within the observation times for which the system was tested, the emulated T1 interface conforms to the standard.

The dotted line illustrates how sensitive the system is to the network delay and delay variation. The MTIE performance shown by the dotted line is the result of a simulation in a zero-delay network. The zero delay was applied only to the modified NTP loop, while the open loop was still exposed to the same level of noise as in other simulations. The penalty ranges between 50% and a factor of 3, suggesting that small delays and delay variation are required.

Provided that the TDM traffic is given the highest queuing priority in the switches, delay variation is determined by the number of hops and the packet size distribution of the background traffic. The mean delay is determined by the number of hops and geographical distances. The environment in which simulations were carried out reflects a realistic metropolitan-size gigabit Ethernet network. The results suggest that the emulation is possible in the MAN environment, while viability of such emulation in the core network, for example a national backbone, must still be explored. Using 10 Gb/s Ethernet systems will improve the delay variation and result in somewhat better MTIE performance, but the mean delay is irreducible.

The time deviation (TDEV) as a function of an integration period $\tau=n\tau_0$ is defined as:

$$TDEV(n\tau_0) = \sqrt{\frac{1}{6n^2(N-3n+1)} \sum_{j=1}^{N-3n+1} A_{j,n}} \quad (17)$$

$$A_{j,n} = \sum_{i=j}^{n+j-1} x_{i+2n} - 2x_{i+n} + x_i$$

where N defines the range of integration periods for which the TDEV is calculated as $n \in \{1, 2, 3, \ldots \lfloor N/3 \rfloor\}$. Similarly to MTIE, the time deviation can also be interpreted as a measure of buffer level when the data are clocked in and out synchronously to the reference and slave clock. While MTIE presented a static measure, in other words a worst case level within an observation time, TDEV provides some insight into dynamic characteristics. Similarly to MTIE, lower TDEV indicates better performance.

Figure 19:
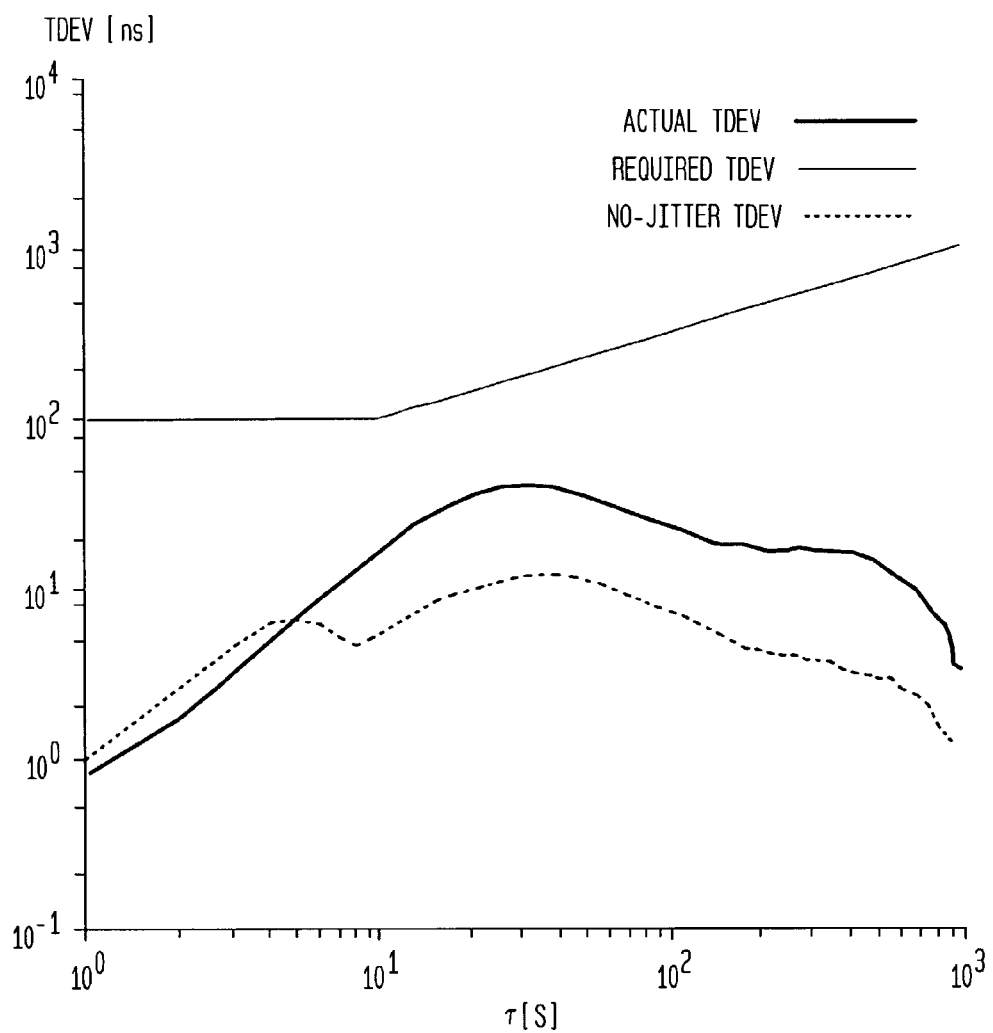
FIG. 19 is a chart showing time deviation.

FIG. 19 compares the TDEV observed in simulations, to the requirement set by the standard. The curve shown in bold represents the measured TDEV in the presence of variable network delay, while the dotted line represents the performance over a delay free network. The results demonstrate conformance to the standard. The same conclusion about the sensitivity to QoS made regarding MTIE above applies here as well.

When designing the system detailed above, much attention was put into the ability to implement the system using readily available components. Although the simulation results presented above are considered very accurate as they model many secondary parameters such as finite precision arithmetic, quantization effects of a digital to analog converter, non-ideal oscillators including the VCO and the local reference, there are still non-modeled secondary side effects that must be kept in mind during the system implementation. Further discussion of system component options and such secondary side effects is now presented.

One of the foundations of the system is measuring the event period with high precision, in other words the "time measurement" block. The measured results in clock ticks are interpreted by other system components as a fixed-point representation of a signal. The local reference frequency determines the granularity of measurements, where higher frequency yields more accurate results. The effect of using a finite frequency is analogous to the quantization of noise effects in signal processing systems. All simulations presented above account for this effect and they have shown that a local reference of around 300 MHz is sufficient to keep the quantization noise from significantly impacting the performance. To avoid using a custom-built oscillator, a 311.04 MHz reference was chosen as a value slightly above the 300 MHz target and which is also roughly an integer multiple of the standard T1 frequency, 1.544 MHz. Frequency variations of the local reference do not impact the recovered clock in locked mode, but they directly propagate to the output in holdover mode, requiring specification of the local reference frequency to conform to Stratum-3 compatibility criteria, assuming that the system is being designed as the carrier-class equipment.

The time measurement block was implemented in FPGA as a 15-bit counter running at 155.52 MHz combined with a circuit that synchronizes the packet arrival that is, measured clock edge event, with the nearest rising or falling edge of the reference clock. The 16-bit measurement is formed by using the counter value for the upper 15 bits, while the least significant bit (LSB) depends on when the two adjacent events have occurred relative to edges of the reference clock. For example, if both events occur closest to the rising edge of the reference clock, the LSB of the measurement value is zero. On the other hand, if the first arrival occurs closer to the rising edge of the reference clock, while the subsequent arrival occurs closer to the falling edge, the LSB of the measurement value will be set to one. This implementation results in an effective 311.04 MHz resolution.

In addition to mapping a 300 MHz counter to a commercially available FPGA, it is important that the interarrival times be measured as close to the physical layer as possible. This represents an implementation challenge as many Ethernet switching components would pass through several independent clock domains before reaching the packet processing block where the arrival of a TDM packet can be recognized. For example, an optical interface usually connects to a serializer/deserializer (SerDes) circuit with the clock implicitly embedded in the data stream. The interface between the SerDes and the medium access control layer is a 10-bit parallel interface clocked at a 125 MHz clock recovered from the link layer data stream. The medium access control layer would typically connect to a packet processing circuit over an independently clocked packet interface, such as 85 MHz IX bus 1720 as shown in FIG. 17. Finally, the core of the packet processor may also be a separate clock domain clocked by a low-accuracy source. To avoid these resynchronizations and the resulting accuracy loss, the arrival times of all packets are measured using a physical-layer (SerDes) circuit with the byte-realignment function disabled. The parallel interface side of the SerDes is connected to FPGA 1725 and the FPGA searches for Start-of-Packet (SOP) characters and records the word in which the event appeared. The amount of shift that would be necessary to realign the word is also recorded. This information is sufficient to construct a pulse with a bit-granularity whose location in time is determined by the packet arrival time. Measuring the time between such pulses generates a train of interarrival time measurements for all traffic at the interface including corrupted and invalid packets. The measurement data are passed to the packet processing section of the FPGA which adds them to an accumulator register until the packet header matches the pattern that designates the monitored TDM stream coming from the master clock source. After the match, the value in the accumulator register is passed to the open loop section of the FPGA and the accumulator is reset to zero.

The next stage in the open loop is a 2,048-tap FIR filter, which ran on each packet arrival. The average packet arrival time was 125 μs. In general, this would require 8K of buffer storage including 4K for filter coefficients and 4K for samples, and a processor capable of executing one multiply-and-accumulate (MAC) operation every 61 nanoseconds (ns), but due to the symmetry of the coefficients, it was possible to implement the filter using 2K storage for coefficients and half the number of MAC operations, one every 122 ns. Since an FPGA was already being used to implement the time measurement block, the FIR filter was implemented in the same FPGA, thus avoiding the use of a high-end DSP. The moving average filter and the downsampling were also implemented in FPGA. Because the downsample rate matched the length of the moving average filter, a long buffer to memorize the last M samples was not necessary. Instead, the decimator block and the moving average filter were merged into a single block which was essentially an accumulator followed by a divider. The accumulator started at the zero value and kept adding the incoming samples until M of them arrived. The resulting value was divided by M, passed to the next block of the system, and the accumulator was reset. To avoid degradation of precision, it was necessary that more than $b_{MAC}+\log_2 M$ bits were used to implement the accumulator, where $b_{MAC}$ was the number of bits used to implement the multiply-and-accumulate unit. In this case 32 bits were used.

The accumulator/decimator circuit was the last stage implemented in FPGA. The samples following this block arrived at a modest rate of 1 sample per second so the rest of the system was implemented using a low-end general purpose processor. The division by M can be performed in hardware by dropping the least significant $\log_2 M$ bits and presenting a 32-bit fixed-point number to the software, or a full result can be taken by the software and rounded if necessary. Since the performance requirements on the processor are modest at this point, floating-point arithmetic is used. Besides the blocks described so far, the "divide-by-N" block of the holdover loop was also implemented in FPGA and all other blocks were embodied in the software running on the general purpose processor.

The exemplary system implementation according to the present invention described above updated the VCO input on the average once per second. As shown above the system successfully corrected for any type of offset or drifter wander as long as the observation times were greater than the update rate and still met the required performance. The only requirement from the VCO was that its deviation, the range over which the output frequency could be linearly controlled by an input voltage, had to be greater than the maximum possible offset that resulted under all conditions during the equipment life cycle. These factors included the accumulated drift at the end of the equipment life cycle, 10 years for example, maximum frequency wander, initial center frequency offset and so on.

For observation times shorter than 1s, the system could not correct the error due to jitter and wander and the system had to rely on the VCO to stay within the specification required from carrier-class TDM equipment. It is important to note that not all of the requirements needed to be met by the VCO. Only those related to short term performance, such as MTIE and TDEV for observation times less than 1 s and the jitter performance, were posed on the VCO. All other performance requirements were met by the clock recovery system as discussed above.

The ability to emulate synchronous services over an asynchronous network infrastructure is important for supporting legacy applications in emerging MAN technologies. Successful emulation removes a major obstacle to smooth transition between circuit-oriented to packet oriented MANs. The clock extraction system presented above meets the performance requirements set by the T1/Ethernet 1 (E1) interface specification regarding the first level of the TDM hierarchy, demonstrating that synchronous services are indeed possible in the Ethernet MAN environment. Further modifications to the system will be needed to meet more rigorous requirements set by the SONET hierarchy and to thus achieve SONET over Ethernet emulation. If achieved, SONET over Ethernet emulation can offer a radically new view to how the metro networks are deployed.

While the present invention has been disclosed in a presently preferred context, it will be recognized that the present teachings may be adapted to a variety of contexts consistent with this disclosure and the claims that follow.

We claim:

1. A system for synchronizing the clock source of a local telecommunications network connected to a remote clock source through an asynchronous transport network, comprising:
a holdover loop comprising a holdover loop reference clock, a clock processor for producing a holdover loop signal comprising a first representation of a clock frequency, a comparator for comparing said holdover loop signal an open loop signal comprising a second representation of the clock frequency to produce a clock frequency error signal, means for utilizing the clock frequency error signal to produce a reconstructed clock frequency signal synchronized with the remote clock source; and
an open loop comprising an open loop reference clock, a packet arrival detector, a packet interarrival time counter, and a first weighting unit, the open loop producing the open loop signal.

2. The system of claim 1, in which said holdover loop comprises a first filter.

3. The system of claim 1, in which the holdover loop comprises a digital to analog converter and a voltage-controlled oscillator.

4. The system of claim 1, in which the clock processor comprises means for comparing a signal from the holdover loop reference clock with an initial holdover loop signal to produce said holdover loop signal.

5. The system of claim 1 in which the asynchronous transport network is an Ethernet metropolitan area transport network.

6. A system for synchronizing the clock source of a local telecommunications network connected to a remote clock source through an asynchronous transport network, comprising:
a holdover loop comprising a holdover loop reference clock, a clock processor for producing a holdover loop signal comprising a first representation of a clock frequency, a comparator for comparing said holdover loop signal and a network time protocol loop signal comprising a second representation of the clock frequency to produce a clock frequency error signal, means for utilizing the clock frequency error signal to produce a reconstructed clock frequency signal synchronized with the remote clock source; and
a network tune protocol loop comprising a network time protocol module, an adder and a second weighting unit, the network time protocol loop producing the network time protocol loop signal.

7. A system for synchronizing the clock source of a local telecommunications network connected to a remote clock source through an asynchronous transport network, comprising:
an open loop comprising an open loop reference clock, a packet arrival detector, a packet interarrival time counter, a first weighting unit, the open loop producing an open loop signal comprising a first representation of the clock frequency of the remote clock source;
a network time protocol loop comprising a network time protocol module, an adder and a second weighting unit, the network time protocol loop producing a network time protocol loop signal comprising a second representation of the clock frequency; and
means for utilizing the open loop signal and the network time protocol loop signal to produce a reconstructed clock frequency signal synchronized with the remote clock source.

8. The system of claim 7 wherein said means comprises:
an adder for combining the open loop signal the network time protocol loop signal.

9. The system of claim 7, in which said open loop comprises a second filter.

10. The system of claim 7, in which the open loop comprises a decimator.

11. The system of claim 7, in which the open loop comprises a moving average filter.

12. The system of claim 7, in which the packet interarrival time counter generates an initial open loop signal.

13. The system of claim 7 in which the asynchronous transport network is an Ethernet metropolitan area transport network.

14. The system of claim 9, in which said second filter is a finite impulse response filter.

15. A system for synchronizing the clock source of a local telecommunications network connected to a remote clock source through an asynchronous transport network, comprising:
a holdover loop comprising a holdover loop reference clock, a clock processor for producing a holdover loop signal comprising a first representation of a clock frequency;
a comparator for comparing said holdover loop signal and an adder output signal to produce a clock frequency error signal, and means for clock frequency utilizing the clock frequency error signal to produce a reconstructed clock signal synchronized with the remote clock source;
an open loop comprising an open loop reference clock, a packet arrival detector, a packet interarrival time counter, and a fast weighting unit, the open loop producing an open loop signal comprising a second representation of the clock frequency;
a network time protocol loop comprising a network time protocol module, an adder and a second weighting unit, the network time protocol loop producing a network time protocol loop signal comprising a third representation of the clock frequency;
an adder for combining the open loop signal and the network time protocol loop signal to produce the adder output signal.

16. A method of synchronizing the clock source of a local telecommunications network connected to a remote clock source through an asynchronous transport network, comprising steps of:
calculating interarrival times of data packets at said local telecommunications network;

using said interarrival times to generate a first reconstructed signal comprising a first representation of a clock frequency;

running a network time protocol over said asynchronous transport network to generate timestamp data;

using said timestamp data to calculate a signal comprising a second representation of the clock frequency;

adding a nominal clock frequency signal to said signal representing the clock frequency, to yield a second reconstructed signal representing the clock frequency; and utilizing the first and second reconstructed signals to generate a clock frequency synchronized with the remote clock source.

17. The method of claim 16 comprising steps of:

applying a first weighting factor to said first reconstructed signal representing the clock frequency to yield a final reconstructed open loop signal representing the clock frequency;

applying a second weighting factor to said second reconstructed signal representing the clock frequency to yield a final reconstructed network time protocol loop signal representing the clock frequency; and controlling said first and second weighting factors so that their sum always equals one, so that the first weighting factor begins as equal to one and tends thereafter toward zero, and so that the second weighting factor begins as equal to zero and tends thereafter toward one.

18. The method of claim 16 comprising the step of filtering said first reconstructed signal representing the clock frequency.

19. The method of claim 16 comprising the step of downsampling said first reconstructed signal representing the clock frequency.

20. The method of claim 16 comprising the step of subjecting said first reconstructed signal representing the clock frequency to moving average filtration.

21. A method of synchronizing the clock source of a local telecommunications network connected to a remote clock source through an asynchronous transport network, comprising steps of:

running a network time protocol over said asynchronous transport network to generate timestamp data;

using said timestamp data to calculate a signal representing the clock frequency of the remote clock; and adding a nominal clock frequency signal to said signal representing the clock frequency, to yield a reconstructed signal comprising a further representation of the clock frequency; and running said network time protocol over said asynchronous transport network to generate timestamp data by transmitting timestamps in-band, transmitting timestamps that represent the packet arrival time at the remote clock source, and implicitly deriving all other timestamps.

22. The method of claim 21 comprising the step of filtering said signal representing the clock frequency.

23. The method of claim 21 comprising running said network time protocol over said asynchronous transport network to generate timestamp data by transmitting, receiving and analyzing timestamps.

* * * * *